(12) United States Patent
Tamura et al.

(10) Patent No.: US 11,595,870 B2
(45) Date of Patent: Feb. 28, 2023

(54) NETWORK NODE, COMMUNICATION METHOD, PROGRAM, AND RECORDING MEDIUM

(71) Applicant: NEC Corporation, Tokyo (JP)

(72) Inventors: Tomu Tamura, Tokyo (JP); Hisashi Futaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/283,046

(22) PCT Filed: Aug. 30, 2019

(86) PCT No.: PCT/JP2019/034123
§ 371 (c)(1),
(2) Date: Apr. 6, 2021

(87) PCT Pub. No.: WO2020/079968
PCT Pub. Date: Apr. 23, 2020

(65) Prior Publication Data
US 2021/0385711 A1    Dec. 9, 2021

(30) Foreign Application Priority Data
Oct. 18, 2018   (JP) .............................. JP2018-196760

(51) Int. Cl.
*H04W 4/00*     (2018.01)
*H04W 36/08*    (2009.01)
(Continued)

(52) U.S. Cl.
CPC ....... *H04W 36/08* (2013.01); *H04W 36/0077* (2013.01); *H04W 36/245* (2013.01); *H04W 36/32* (2013.01)

(58) Field of Classification Search
CPC ............. H04W 36/08; H04W 36/0077; H04W 36/245; H04W 36/32; H04W 36/0066; H04W 8/20; H04W 88/14; H04W 92/24
(Continued)

(56) References Cited

U.S. PATENT DOCUMENTS

| | | | |
|---|---|---|---|
| 2008/0049677 A1 | 2/2008 | Hayashi | |
| 2014/0241316 A1* | 8/2014 | Okmyanskiy | ..... H04W 72/0453 370/331 |

(Continued)

FOREIGN PATENT DOCUMENTS

| | | |
|---|---|---|
| JP | 2012-110051 A | 6/2012 |
| JP | 2019-096952 A | 6/2019 |

(Continued)

OTHER PUBLICATIONS

English translation of Written opinion for PCT Application No. PCT/JP2019/034123, dated Oct. 8, 2019.
(Continued)

*Primary Examiner* — Marcos Batista
(74) *Attorney, Agent, or Firm* — Sughrue Mion, PLLC

(57) ABSTRACT

In order to prevent deterioration of QoE of a user in intersystem handover, an apparatus according to the present invention includes: an information obtaining unit configured to obtain network slice related information related to a network slice used by a terminal apparatus in a first radio communication system; and a first communication processing unit configured to transmit, to a second network node of a second radio communication system, a message for intersystem handover of the terminal apparatus from the first radio communication system to the second radio communication system, the message including the network slice related information.

9 Claims, 14 Drawing Sheets

(51) Int. Cl.
*H04W 36/00* (2009.01)
*H04W 36/24* (2009.01)
*H04W 36/32* (2009.01)

(58) Field of Classification Search
USPC .................................. 370/331, 339; 455/312
See application file for complete search history.

(56) References Cited

U.S. PATENT DOCUMENTS

| | | | |
|---|---|---|---|
| 2018/0192337 A1 | 7/2018 | Ryu et al. | |
| 2018/0352491 A1* | 12/2018 | Shih ........................ | H04W 36/14 |
| 2018/0376384 A1 | 12/2018 | Youn et al. | |
| 2019/0058997 A1 | 2/2019 | Futaki et al. | |
| 2020/0045592 A1* | 2/2020 | Wu ........................ | H04W 36/14 |
| 2020/0322850 A1* | 10/2020 | Zhu ........................ | H04W 76/25 |
| 2020/0336964 A1 | 10/2020 | Kawasaki et al. | |

FOREIGN PATENT DOCUMENTS

| | | |
|---|---|---|
| WO | 2018/128529 A1 | 7/2018 |
| WO | 2018/029930 A1 | 6/2019 |

OTHER PUBLICATIONS

International Search Report for PCT Application No. PCT/JP2019/034123, dated Oct. 8, 2019.
3rd Generation Partnership Project, "Technical Specification Group Services and System Aspects; System Architecture for the 5G System; Stage 2 (Release 15)", 3GPP TS23.501 V15.3.0, Sep. 2018, pp. 1-226.
3rd Generation Partnership Project, "Technical Specification Group Services and System Aspects; Procedures for the 5G System; Stage 2 (Release 15)", 3GPP TS23.502 V15.3.0, Sep. 2018, pp. 1-329.
3rd Generation Partnership Project, "Technical Specification Group Services and System Aspects; General Packet Radio Service (GPRS) enhancements for Evolved Universal Terrestrial Radio Access Network (E-UTRAN) access (Release 16)", 3GPP TS23.401 V16.0.0, Sep. 2018. pp. 1-47.
Japanese Office Communication for JP Application No. 2020-552571 dated Nov. 15, 2022 with English Translation.
Huawei, HiSilicon, Nokia, Ericsson, InterDigital Inc., "OI#4b: TS 23.501: Network slicing interworking with eDécor", [online], 3GPP TSG SA WG2 #124, S2-179565, Dec. 1, 2017.

* cited by examiner

| IDENTIFICATION INFORMATION 501 | QUALITY INFORMATION 503 | USAGE INFORMATION 505 | |
|---|---|---|---|
| | | ACCUMULATED USAGE INFORMATION 507 | PERIOD USAGE INFORMATION 509 |
| eMBB | 7 | 600 [min] | 10 [min] |
| URLLC | 79 | 1200 [min] | 5 [min] |

| TARGET CELL 901 | SUCCESS RATE INFORMATION 902 |
|---|---|
| CELL 2-1 | 99% |
| CELL 3-1 | 70% |
| CELL 4-1 | 99% |
| CELL 5-1 | 99% |
| CELL 6-1 | 99% |

FIG.10

NETWORK NODE, COMMUNICATION METHOD, PROGRAM, AND RECORDING MEDIUM

This application is a National Stage Entry of PCT/JP2019/034123 filed on Aug. 30, 2019, which claims priority from Japanese Patent Application 2018-196760 filed on Oct. 18, 2018, the contents of all of which are incorporated herein by reference, in their entirety.

BACKGROUND

Technical Field

The present invention relates to a network node in a radio communication system, and a communication method, a program, and a recording medium for the network node.

Background Art

At present, in 3rd Generation Partnership Project (3GPP), study of system architecture of the fifth generation mobile communication system (hereinafter "5G system") and a 5G core network (hereinafter "5GC") has been conducted. In particular, in network architecture specifications (NPL 1: 3GPP TS 23.501 and NPL 2: 3GPP TS 23.502), the technique of network slicing has been under study. Network slicing is a technique in which one network physical facility is split logically (virtually), and the split logical facilities (virtual resources) are combined to constitute a logical communication network referred to as a network slice (or a slice) (NPLs 1 and 2).

The network slice is a logical network that is provided as a network having specific capability and characteristics. One or more network slices can be selected and used according to a service required by a User Equipment (UE). In particular, traffic of various communication characteristics, such as large-capacity mobile broadband communication (enhanced Mobile Broadband (eMBB)) for video streaming or the like, ultra low-latency and high-reliability communication (Ultra Reliable Low Latency Communications (URLLC)) for automated driving or the like, and multiple simultaneous access (massive Machine Type Communications (mMTC)) for IoT or the like can be distributed to desired network slices.

In contrast, the fourth generation mobile communication system (hereinafter "4G system") includes a core network referred to as an Evolved Packet Core (EPC). The EPC may include one or more dedicated core networks (DCNs) for specific application, and can distribute various types of traffic to networks according to the traffic (NPL 3).

FIG. 11 is a schematic diagram of a system including a 5GC 1001 and an EPC 1002. The 5GC 1001 includes one or more network slices, and the EPC 1002 includes one or more DCNs. When a UE can use a 5G system and a 4G system, the UE can perform intersystem handover. In addition, the UE can use the network slice of the 5GC 1001 or the DCN of the EPC 1002 according to traffic of the UE.

CITATION LIST

Non Patent Literature

NPL 1: 3GPP TS 23.501 V15.3.0 (2018-09)
NPL 2: 3GPP TS 23.502 V15.3.0 (2018-09)
NPL 3: 3GPP TS 23.401 V16.0.0 (2018-09)

SUMMARY

Technical Problem

However, when a UE using a predetermined network slice performs intersystem handover to another system and if such another system of a handover target does not support a network slice function, such another system may not be able to select an appropriate network. If such another system is unable to select an appropriate network, the UE results in using a network not appropriate for the traffic of the UE, which may deteriorate quality of experience (QoE) of the user.

In the light of the problems described above, the example object of the present invention is to provide a network node that enables selection of a network appropriate for traffic of a UE after intersystem handover, and a communication method, a program, and a recording medium for the network node.

Solution to Problem

A first network node according to the present invention includes: an information obtaining unit configured to obtain network slice related information related to a network slice used by a terminal apparatus in the first radio communication system; and a first communication processing unit configured to transmit, to a second network node of a second radio communication system, a message for intersystem handover of terminal apparatus from the first radio communication system to the second radio communication system, the message including the network slice related information.

A second network node according to the present invention includes: a communication processing unit configured to receive, from a first network node of a first radio communication system, a message for intersystem handover of a terminal apparatus from the first radio communication system to the second radio communication system, the message including network slice related information related to a network slice used by the terminal apparatus in the first radio communication system; and a network selection unit configured to select a core network to be used by the terminal apparatus in the second radio communication system, based on the network slice related information.

A first method according to the present invention includes: obtaining network slice related information related to a network slice used by a terminal apparatus in the first radio communication system; and transmitting, to a second network node of a second radio communication system, a message for intersystem handover of the terminal apparatus from the first radio communication system to the second radio communication system, the message including the network slice related information.

A second method according to the present invention includes: receiving, from a first network node of a first radio communication system, a message for intersystem handover of a terminal apparatus from the first radio communication system to the second radio communication system, the message including network slice related information related to a network slice used by the terminal apparatus in the first radio communication system; and selecting a core network to be used by the terminal apparatus in the second radio communication system, based on the network slice related information.

A first program according to the present invention causes a processor to execute: obtaining network slice related information related to a network slice used by a terminal apparatus in the first radio communication system; and transmitting, to a second network node of a second radio communication system, a message for intersystem handover of the terminal apparatus from the first radio communication system to the second radio communication system, the message including the network slice related information.

A second program according to the present invention causes a processor to execute: receiving, from a first network node of a first radio communication system, a message for intersystem handover of a terminal apparatus from the first radio communication system to the second radio communication system, the message including network slice related information related to a network slice used by the terminal apparatus in the first radio communication system; and selecting a core network to be used by the terminal apparatus in the second radio communication system, based on the network slice related information.

A first recording medium according to the present invention is a non-transitory computer-readable recording medium having recorded thereon a program, the program causing a processor to execute: obtaining network slice related information related to a network slice used by a terminal apparatus in the first radio communication system; and transmitting, to a second network node of a second radio communication system, a message for intersystem handover of the terminal apparatus from the first radio communication system to the second radio communication system, the message including the network slice related information.

A second recording medium according to the present invention is a non-transitory computer-readable recording medium having recorded thereon a program, the program causing a processor to execute: receiving, from a first network node of a first radio communication system, a message for intersystem handover of a terminal apparatus from the first radio communication system to the second radio communication system, the message including network slice related information related to a network slice used by the terminal apparatus in the first radio communication system; and selecting a core network to be used by the terminal apparatus in the second radio communication system, based on the network slice related information.

Advantageous Effects of Invention

According to the present invention, a network appropriate for the traffic of the UE can be selected after intersystem handover in a radio communication system, and deterioration of QoE of the user can thus be prevented.

BRIEF DESCRIPTION OF THE DRAWINGS

FIG. 6 is a diagram illustrating an example of network slice related information 500;

FIG. 10 is a diagram illustrating an example of handover history information 900;

DESCRIPTION OF THE EXAMPLE EMBODIMENTS

Figure 1:
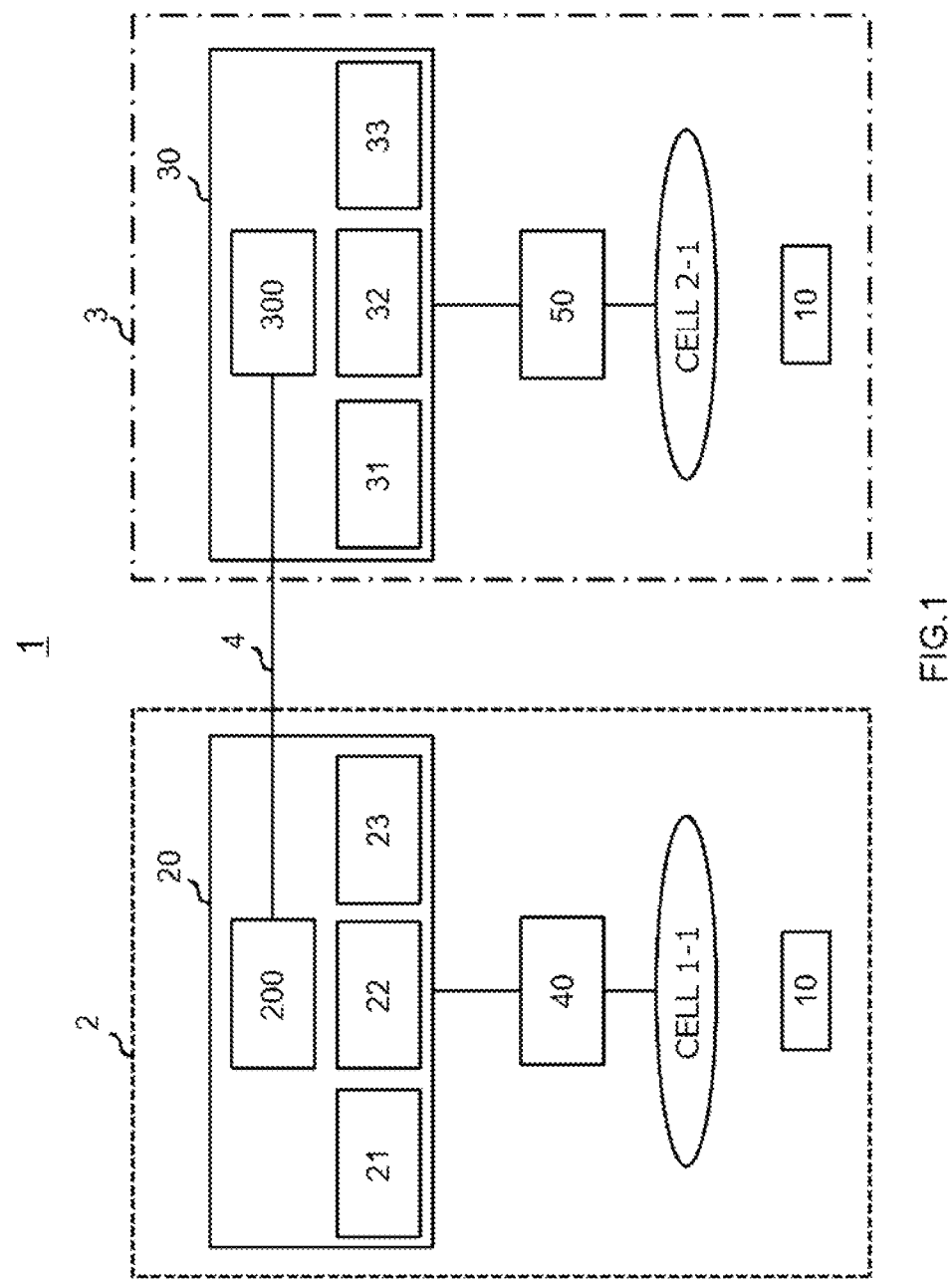
FIG. 1 is a diagram illustrating a configuration of a system 1 according to a first example embodiment.

Hereinafter, example embodiments of the present invention will be described in detail with reference to the accompanying drawings. Note that, in the Specification and drawings, elements to which similar descriptions are applicable are denoted by the same reference signs, and overlapping descriptions may hence be omitted.

Descriptions will be given in the following order.
1. Overview of Example Embodiments of the Present Invention
2. First Example Embodiment
2.1 Configuration of System
2.2 Configuration of First Network Node 200
2.3 Configuration of Second Network Node 300
2.4 Technical Features
2.5 Example Alterations
3. Second Example Embodiment
3.1 System Configuration
3.2 Configuration of First Network Node 200
3.3 Configuration of Second Network Node 300
3.4 Technical Features
4. Other Example Embodiments 1. Overview of Example Embodiments of the Present Invention (1) Technical Problem A terminal apparatus may be able to use a plurality of communication systems. Each of the communication systems may include an access network and a higher network of the access network. The higher network may include one or more partial networks, and each of the partial networks may be designed to have predetermined network characteristics that satisfy a predetermined communication requirement.

The terminal apparatus can use a partial network having predetermined network characteristics in each of the communication systems. However, a partial network of one communication system and a partial network of another communication system may have network characteristics different from each other. Thus, when the terminal apparatus performs a change between the communication systems, a partial network having network characteristics that are similar to those of a partial network used in a change source communication system by a terminal apparatus is not necessarily present in a change target communication system.

In such a case, if the terminal apparatus cannot use a desired partial network in the change target communication system, the terminal apparatus results in using a network that is not appropriate for traffic of the terminal apparatus. As a result, quality of experience of the user may be deteriorated.

(2) Technical Features

In view of this, one technical feature of the present invention includes that, when a change between communication systems is performed, a node of a change source communication system transmits information related to a partial network used by the terminal apparatus in the change source communication system to a node of a change target communication system by including the information in a message for change of the communication system. In addition, another technical feature of the present invention includes that the node of the change target communication system receives the message, and selects a partial network to be used by the terminal apparatus in the change target communication system, based on information related to the partial network used by the terminal apparatus in the change source communication system.

In this manner, the node of the change target communication system can select a partial network appropriate for the terminal apparatus, and deterioration of QoE of the user can thus be prevented.

Note that the above-described technical features are an overview of the example embodiments of the present invention, and as a matter of course, the example embodiments of the present invention are not limited to the above-described technical features.

2. First Example Embodiment

With reference to FIG. 1 to FIG. 10, a first example embodiment will be described.

<2.1 Configuration of System>

With reference to FIG. 1, an example of a configuration of a system 1 according to the first example embodiment will be described. As illustrated in FIG. 1, the system 1 includes a first radio communication system 2 and a second radio communication system 3. The two radio communication systems are connected to each other by an interface 4.

For example, the first radio communication system 2 of the system 1 is a system that conforms to standards of the 3rd Generation Partnership Project (3GPP). More specifically, the first radio communication system 2 is a 5G system. For example, the second radio communication system 3 of the system 1 is a system that conforms to standards of 3GPP. More specifically, the second radio communication system 3 is a 4G system. Alternatively, the first radio communication system 2 or the second radio communication system 3 may be a system that does not conform to 3GPP. As a matter of course, the configuration of the system 1 is not limited to the example described above.

(1) First Radio Communication System 2

The first radio communication system 2 includes a first core network 20, a first base station 40, and a UE 10. The first core network 20 is a network for transferring communication from a radio access network to another network. For example, the first core network 20 is a core network that conforms to 3GPP. More specifically, the first core network 20 may be a 5G Core Network (5GC).

The first core network 20 may include one or more partial networks. Each of the partial networks may be a logically configured network, or may be a physically configured network. Alternatively, each of the partial networks may be a network combining such a logically configured network and a physically configured network.

More specifically, in the first example embodiment, the first core network 20 includes one or more network slices 21 to 23. Each of the network slices 21 to 23 is a network having specific capability, purpose, or characteristics, and is a logically configured network.

Note that FIG. 1 illustrates three network slices 21 to 23. However, the number of network slices is not limited to the example described above. The network in the first core network 20 may be a combination of a network slice and a non-network slice. In some cases, the first core network 20 may not include a network slice.

Network characteristics that satisfy respective different communication requirements are configured for the network slices 21 to 23, and for example, the network slice 21 is associated with eMBB for high speed and large capacity, the network slice 22 is associated with URLLC for high reliability and low latency, and the network slice 23 is associated with MIoT for multiple simultaneous access. For example, the characteristics of eMBB may be used for services for high resolution streaming, broadband, and the like. For example, the characteristics of URLLC may be used for services for automated driving, remote surgical operations, and the like. For example, the characteristics of MIoT may be used for services using smart meters, sensor devices, and the like.

The first core network 20 includes one or more first network nodes 200. The one or more first network nodes 200 may or may not be included in a specific network slice. The first network node 200 performs predetermined management for the UE 10 to use the first core network 20. For example, the first network node 200 has a management function that conforms to 3GPP. More specifically, the first network node 200 may be an Access and Mobility Function (AMF) of the 5G system.

(2) Second Radio Communication System 3

The second radio communication system 3 includes a second core network 30, a second base station 50, and a UE 10. The second core network 30 is a network for transferring communication from a radio access network to another network. For example, the second core network 30 is a core network that conforms to 3GPP. More specifically, the second core network 30 may be an Evolved Packet Core (EPC).

The second core network 30 may include one or more partial networks. Each of the partial networks may be a logically configured network, or may be a physically configured network. Alternatively, each of the partial networks may be a network combining such a logically configured network and a physically configured network.

More specifically, in the first example embodiment, the second core network 30 is one or more dedicated core networks (DCNs) 31 to 33 for specific application. Each of the DCNs 31 to 33 is a network having specific capability, purpose, or characteristics. Each of the DCNs 31 to 33 may be a logical network, or may be a physical network.

Note that FIG. 1 illustrates three DCNs 31 to 33. However, the number of DCNs is not limited to the example described above. The network in the second core network 30 may be a combination of a DCN and a non-DCN. In some cases, the second core network 30 may not include a DCN.

Network characteristics that satisfy respective different communication requirements are configured for the DCNs 31 to 33, and for example, the DCN 31 is associated with network characteristics corresponding to "high speed", the DCN 32 is associated with network characteristics corresponding to "low latency", and the DCN 33 is associated with network characteristics corresponding to "multiple access". For example, the characteristics of "high speed" may be used for services for high resolution streaming, broadband, and the like. For example, the characteristics of "low latency" may be used for services for automated driving, remote surgical operations, and the like. For example, the characteristics of "multiple access" may be used for services using smart meters, sensor devices, and the like.

The second core network 30 includes one or more second network nodes 300. The one or more second network nodes 300 may or may not be included in a specific DCN. The second network node 300 performs predetermined management for the UE 10 to use the second core network 30. For example, the second network node 300 has a management function that conforms to 3GPP. More specifically, the second network node 300 may be a Mobility Management Entity (MME) of the 4G system.

(3) Interface 4

The first radio communication system 2 and the second radio communication system 3 are connected to each other by using a predetermined interface 4. For example, the predetermined interface 4 may be an interface that conforms to 3GPP, or may be an interface that does not conform to 3GPP. More specifically, in the first example embodiment, the predetermined interface 4 is an "N26 interface" that conforms to standards of 3GPP. Note that the mode of the predetermined interface 4 is not limited to the example described above. The predetermined interface 4 may be an interface allowing direct connection or indirect connection of the first radio communication system 2 and the second radio communication system 3.

(4) First Base Station 40 and Second Base Station 50

The first base station 40 is a node in a radio access network of the first radio communication system 2, and performs radio communication with the UE 10 that is located in a cell 1-1. In contrast, the second base station 50 is a node in a radio access network of the second radio communication system 3, and performs radio communication with the UE 10 that is located in a cell 2-1. The first base station 40 and the second base station 50 may each include a plurality of units (or a plurality of nodes).

For example, the first base station 40 and the second base station 50 are each a base station that conforms to 3GPP. More specifically, the first base station 40 may be a base station (RAN Node) of 5G/New Radio (NR). The base station of 5G may be, for example, a base station referred to as a gNB. The second base station 50 may be an Evolved Node B (eNB) of LTE/E-UTRAN. As a matter of course, the first base station 40 and the second base station 50 are not limited to the examples described above.

Figure 2:
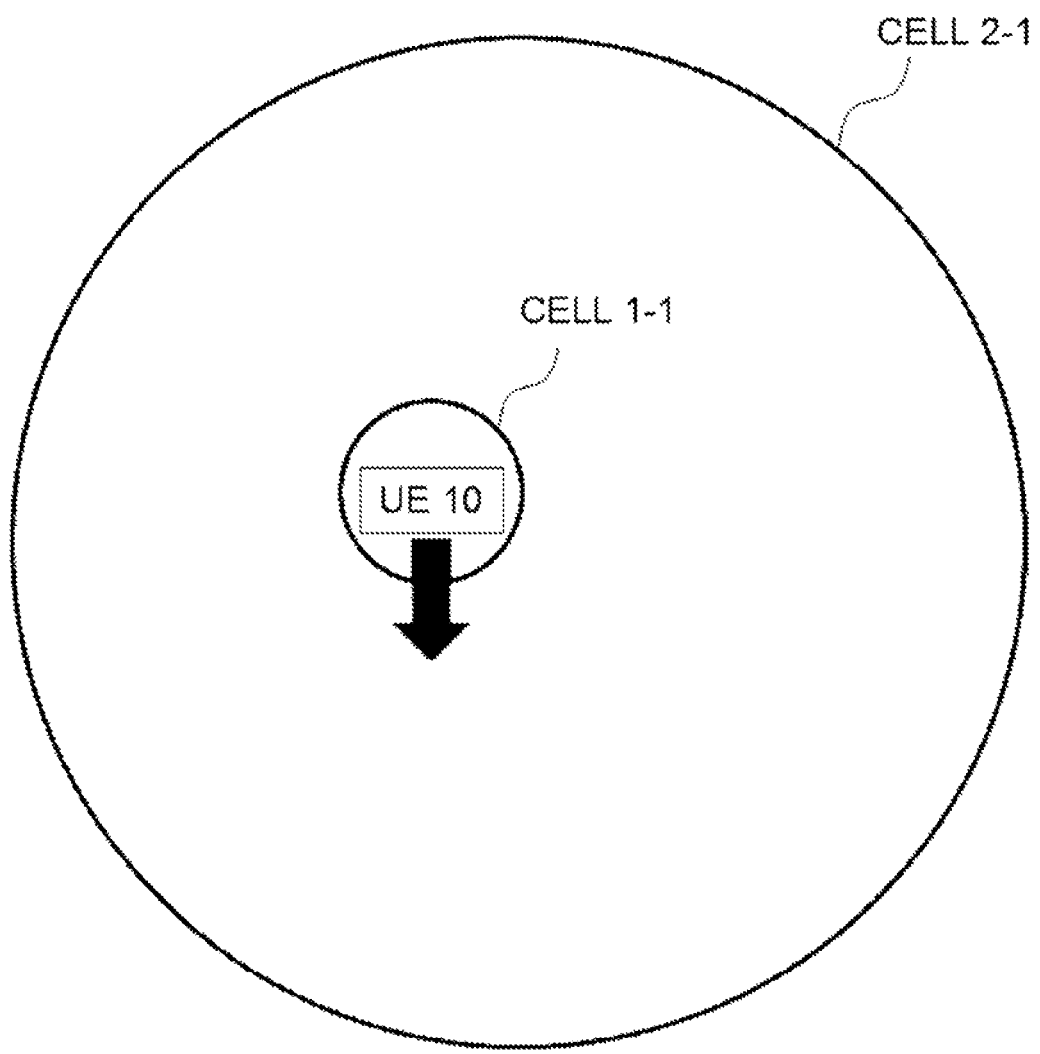
FIG. 2 is a diagram illustrating a hierarchical cell structure according to the first example embodiment.

Along with increase in traffic of data communication of recent years, there has been a tendency of adopting the hierarchical cell structure (HCS), in which a large number of small cells with the purpose of securing capacity are installed in service areas (macro cells) of a base station with the purpose of securing coverage. FIG. 2 is a diagram illustrating the hierarchical cell structure according to the first example embodiment. For example, the cell 1-1 covered by the first base station 40 may be a cell for securing capacity. The cell 2-1 covered by the second base station 50 may be a cell with the purpose of securing coverage.

<2.2 Configuration of First Network Node 200>

Figure 3:
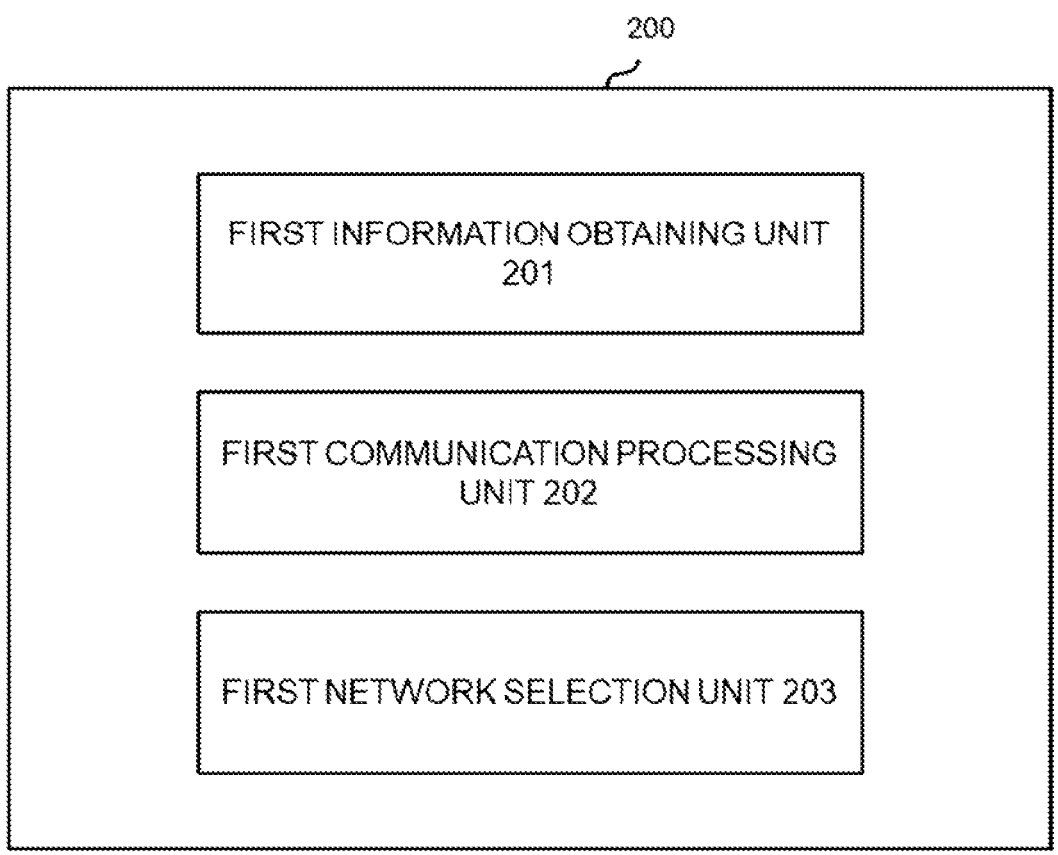
FIG. 3 is a diagram illustrating a first network node 200 according to the first example embodiment.

FIG. 3 is a diagram illustrating the first network node 200 according to the first example embodiment. The first network node 200 includes one or more functional units. For example, the first network node 200 includes a first information obtaining unit 201 and a first communication processing unit 202. In addition, the first network node 200 may include a first network selection unit 203. The first network selection unit 203 will be described in the second example alteration to be described later. As a matter of course, the first network node 200 may include another functional unit.

The first network node 200 may be implemented with hardware, or may be implemented as software. As a specific example of implementation as software, the first network node 200 may be configured as a virtualized network node by using a virtualization technology of a network function. In addition, the virtualized network node may be configured in a single physical apparatus, or may be deployed in a plurality of physical apparatuses in a distributed manner. The virtualized network node may be managed by a predetermined management apparatus. As a matter of course, constituent units included in the first network node 200 is not limited to the example described above.

The first information obtaining unit 201 obtains predetermined information related to the first core network 20 used by the UE 10. For example, the predetermined information obtained by the first information obtaining unit 201 is information related to the network slice included in the first core network 20. More specifically, the information related to the network slice is information related to the network slice used by the UE 10 in the first radio communication system 2, and the number of pieces of the information may be one or more. In the first example embodiment, the information related to the network slice used by the UE 10 is referred to as, for example, network slice related information (Network Slicing Related Info) 500.

The obtaining performed by the first information obtaining unit 201 may be obtaining from a predetermined module or storage means present inside the first network node 200. Alternatively, the obtaining performed by the first information obtaining unit 201 may be obtaining from an external apparatus (or node) of the first network node 200.

The first communication processing unit 202 performs communication processing with the UE 10, the first base station 40, the network node in the first radio communication system 2, and the network node in the second radio communication system 3. For example, the first communication processing unit 202 performs communication processing for intersystem handover with a predetermined network node in the second radio communication system 3. More specifically, the first communication processing unit 202 performs communication processing for intersystem handover by transmitting and receiving one or more messages to and from the second network node 300 in the second radio communication system 3.

<2.3 Configuration of Second Network Node 300>

Figure 4:
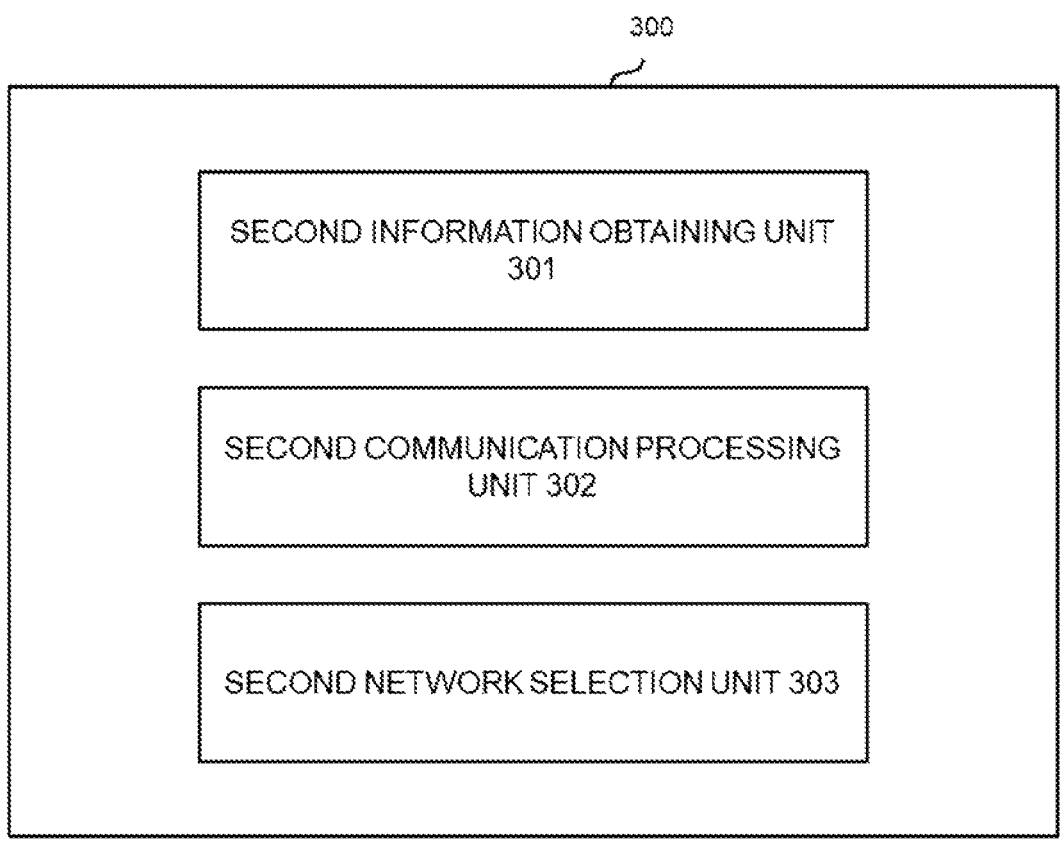
FIG. 4 is a diagram illustrating a second network node 300 according to the first example embodiment.

FIG. 4 is a diagram illustrating the second network node 300 according to the first example embodiment. The second network node 300 includes one or more functional units. For example, the second network node 300 includes a second communication processing unit 302 and a second network selection unit 303. In addition, the second network node 300 may include a second information obtaining unit 301. The second information obtaining unit 301 will be described in the second example alteration to be described later. As a matter of course, the second network node 300 may include another functional unit.

The second network node 300 may be implemented with hardware, or may be implemented as software. As a specific example of implementation as software, the second network node 300 may be configured as a virtualized network node by using a virtualization technology of a network function. In addition, the virtualized network node may be configured in a single physical apparatus, or may be deployed in a plurality of physical apparatuses in a distributed manner. The virtualized network node may be managed by a predetermined management apparatus. As a matter of course, constituent units included in the second network node 300 is not limited to the example described above.

The second network selection unit 303 selects a core network to be used by the UE 10. For example, the second network selection unit 303 selects a core network that is appropriate for the UE 10, based on one or more pieces of predetermined information. The one or more pieces of predetermined information may be obtained from the outside of the second network node 300, or may be obtained from the inside of the second network node 300. More specifically, the second network selection unit 303 selects a core network appropriate for the UE 10 out of one or more core networks included in the second core network 30, with reference to information related to a communication requirement required by the traffic of the UE 10. Alternatively, the second network selection unit 303 may select a core network to be used by the UE 10, based on a failure state, a load state, or the like in the second core network 30.

The second communication processing unit 302 performs communication processing with the UE 10, the second base station 50, the network node in the second radio communication system 3, and the network node in the first radio communication system 2. For example, the second communication processing unit 302 performs communication processing for intersystem handover with a network node in the first radio communication system 2. More specifically, the second communication processing unit 302 performs communication processing for intersystem handover by transmitting and receiving one or more messages to and from the first network node 200 in the first radio communication system 2.

<2.4 Technical Features>

Figure 5:
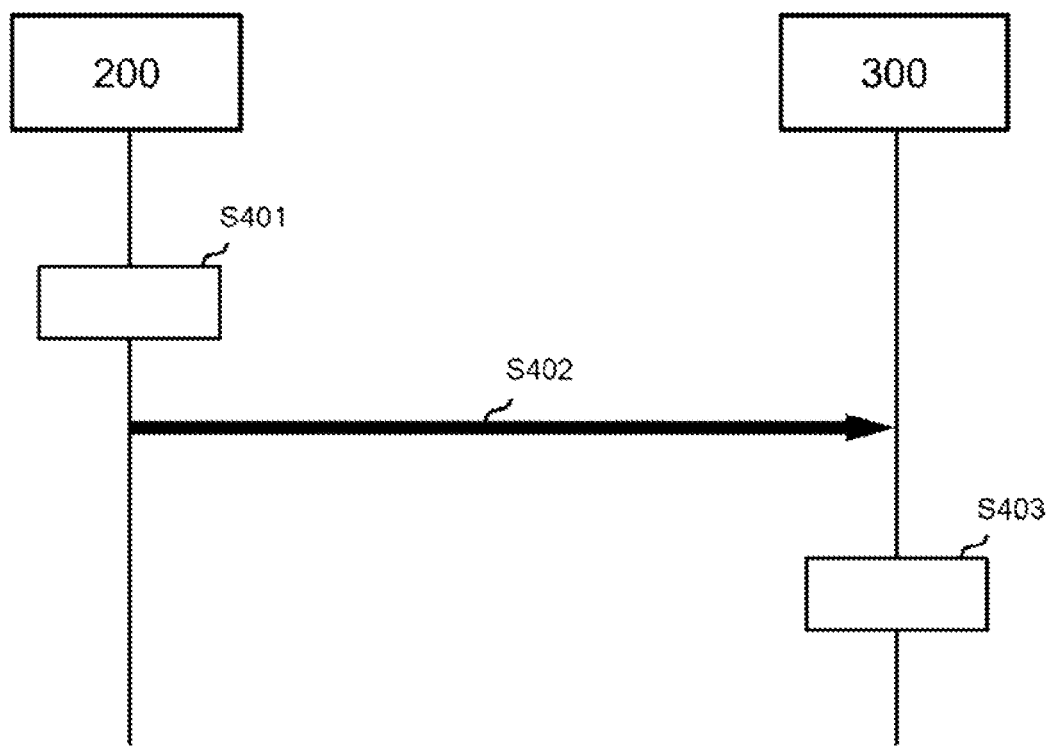
FIG. 5 is a sequence diagram illustrating technical features of the first example embodiment.

FIG. 5 is a sequence diagram illustrating technical features of the first example embodiment.

The first network node 200 (first information obtaining unit 201) obtains information related to the network slices 21 to 23 used by the UE 10 in the first radio communication system 2 (S401). The obtained information is referred to as network slice related information 500. The first network node 200 (first communication processing unit 202) transmits a message for intersystem handover to the second network node 300 (S402). The transmitted message includes the network slice related information 500.

The second network node 300 (second communication processing unit 302) receives the message from the first network node 200. When the message includes the network slice related information 500, the second network node 300 (second network selection unit 303) selects a core network to be used by the UE 10 in the second radio communication system 3, based on the network slice related information 500 (S403).

(1) Network Slice Related Information 500

With reference to FIG. 6, an example of the network slice related information 500 will be described. The network slice related information 500 includes information for indicating network characteristics of the network slice used by the UE 10. For example, the network slice related information 500 includes any one or more pieces of information out of identification information 501, quality information 503, accumulated usage information 507 included in usage information 505, and period usage information 509 included in the usage information 505. Alternatively, a combination of two or more out of these pieces of information may be used, or all of these pieces of information may be included. The pieces of information included in the network slice related information 500 are not limited to the above-described pieces of information.

(1-1) Identification Information 501

For example, the network slice related information 500 may include the identification information 501. The identification information 501 is information for identifying the network slice to be used by the UE 10, and various forms of information, such as character information, symbol information, numerical value information, or coded information, may be adopted. More specifically, the identification information 501 includes information for allowing identification of the network slice, such as "eMBB" and "URLLC".

A receiver node (for example, the second network node 300) that receives the network slice related information 500 may hold information related to communication requirements of the traffic, network characteristics, or the like corresponding to the identification information 501 such as "eMBB" and "URLLC" in advance. For example, when the slice indicated by the identification information 501 is "eMBB", the receiver node (for example, the second network node 300) may hold information for allowing identification that the traffic belonging to the slice is of a traffic type of voice data, video streaming, or the like. Alternatively, when the slice indicated by the identification information 501 is "eMBB", the receiver node (for example, the second network node 300) may hold information for allowing identification that the traffic belonging to the slice is of a traffic type in which a permissible delay time period is a predetermined time period and the packet error rate is defined as a predetermined value.

(1-2) Quality Information 503

For example, the network slice related information 500 may include the quality information 503. The quality information 503 may be information indicating a communication requirement required by the traffic of the UE 10. This is because the network characteristics of the network slice to be used by the UE 10 are in some cases determined in accordance with the communication requirement required by the traffic of the UE 10. Specifically, the quality information 503 may be information indicating QoS. More specifically, the quality information 503 may be information indicating QoS allocated to a communication flow that belongs to a predetermined network slice in the first radio communication system 2. The information indicating the QoS may be 5QI that conforms to standards of 3GPP, or may be an indicator that does not conform to standards of 3GPP. As a matter of course, using a value of the 5QI is merely an example of the first example embodiment.

With reference to FIG. 6, the value of the quality information 503 will be described. For example, the value of the quality information 503 illustrated in FIG. 6 is the 5QI value. "7" of the 5QI value indicates, for example, QoS characteristics based on a combination of the permissible delay time period of 100 ms and the packet error rate of $1 \times 10^{-3}$ or the like. "79" of the 5QI value indicates, for example, QoS characteristics based on a combination of the permissible delay time period of 50 ms and the packet error rate of $1 \times 10^{-2}$ or the like. As a matter of course, using the 5QI value for the quality information 503 is merely an example.

Instead of the 5QI value, an indicator indicating only a part of the QoS characteristics corresponding to the 5QI value may be used. For example, only the permissible delay time period may be used as the quality information 503. An indicator encompassing a plurality of QoS characteristics may be used. For example, a resource type such as the Guaranteed Bit Rate (GBR) in which a band is guaranteed or the Non-Guaranteed Bit Rate (non-GBR) in which a band is not guaranteed may be used. Specifically, information indicating whether the slice used by the UE 10 is the slice of the GBR or the slice of the non-GBR may be used.

(1-3) Usage Information 505

For example, the network slice related information 500 may include the usage information 505. The usage information 505 is information related to the network slice that has been used by the UE 10, and is information related to use for each network slice. For example, the usage information 505 may be time information related to time in which the UE 10 has used a specific network slice. More specifically, the time information includes at least one or more of accumulated usage information 507 related to an accumulated time period in which the network slice has been used, and period usage information 509 indicating a time period in which the network slice has been used within a predetermined period before handover. Alternatively, the usage information 505 may include the number of times, frequency, intervals, or the like of the UE 10 having used a specific network slice. The usage information may be a time period, the number of times, frequency, intervals, or the like of the UE 10 not using a specific network slice.

The accumulated usage information 507 indicates an accumulated time period for each network slice that has been used in the first radio communication system 2. For example, regarding the accumulated usage information 507, time measurement can be started from any time point, and accumulation can be reset at any time point. The accumulated usage information 507 can indicate statistical information related to network slice use of the UE 10. More specifically, as illustrated in FIG. 6, the UE 10 uses eMBB for 600 minutes and uses URLLC for 1200 minutes. Note that, as a matter of course, the accumulated usage information 507 is not limited to the example described above.

The period usage information 509 indicates a time period for each network slice that has been used in the first radio communication system 2, and a time period that has been used within a predetermined period before handover. For example, the period usage information 509 may be a time period in which the UE 10 has used the slice from a specific time point that is converted based on a time point at which handover occurs to a time point at which the handover occurs. The period usage information 509 can indicate a short-term tendency related to network slice use of the UE 10. More specifically, as illustrated in FIG. 6, the UE 10 uses eMBB for 10 minutes and uses URLLC for 5 minutes before handover. In addition, provided that the predetermined period before handover is 60 minutes, a ratio that the UE 10 has used the slice during 60 minutes before the occurrence of the handover can be specified. Note that, as a matter of course, the period usage information 509 is not limited to the example described above.

(2) Intersystem Handover

Figure 7:
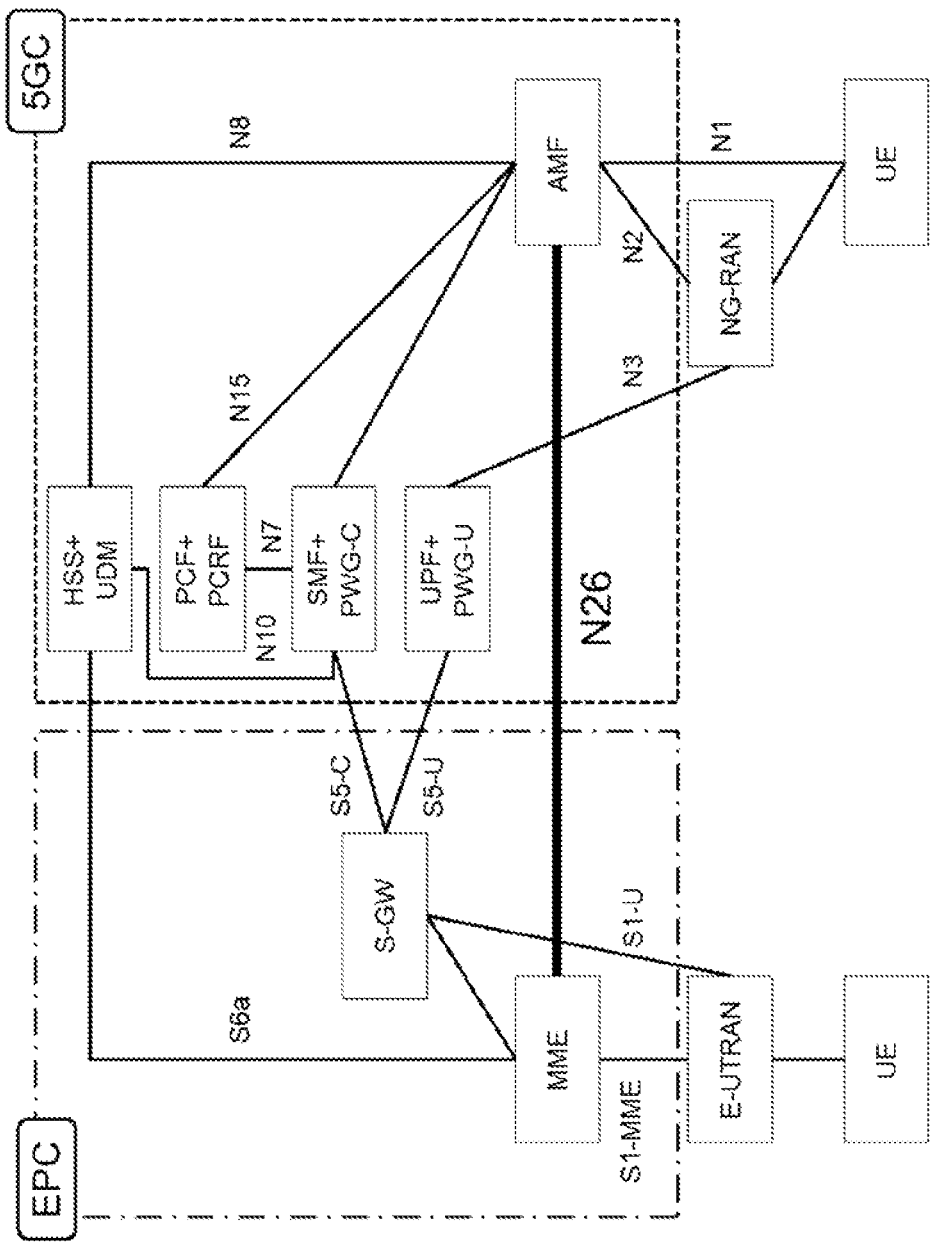
FIG. 7 is a schematic diagram illustrating architecture of interconnection between a 5GC and an EPC.
Figure 8:
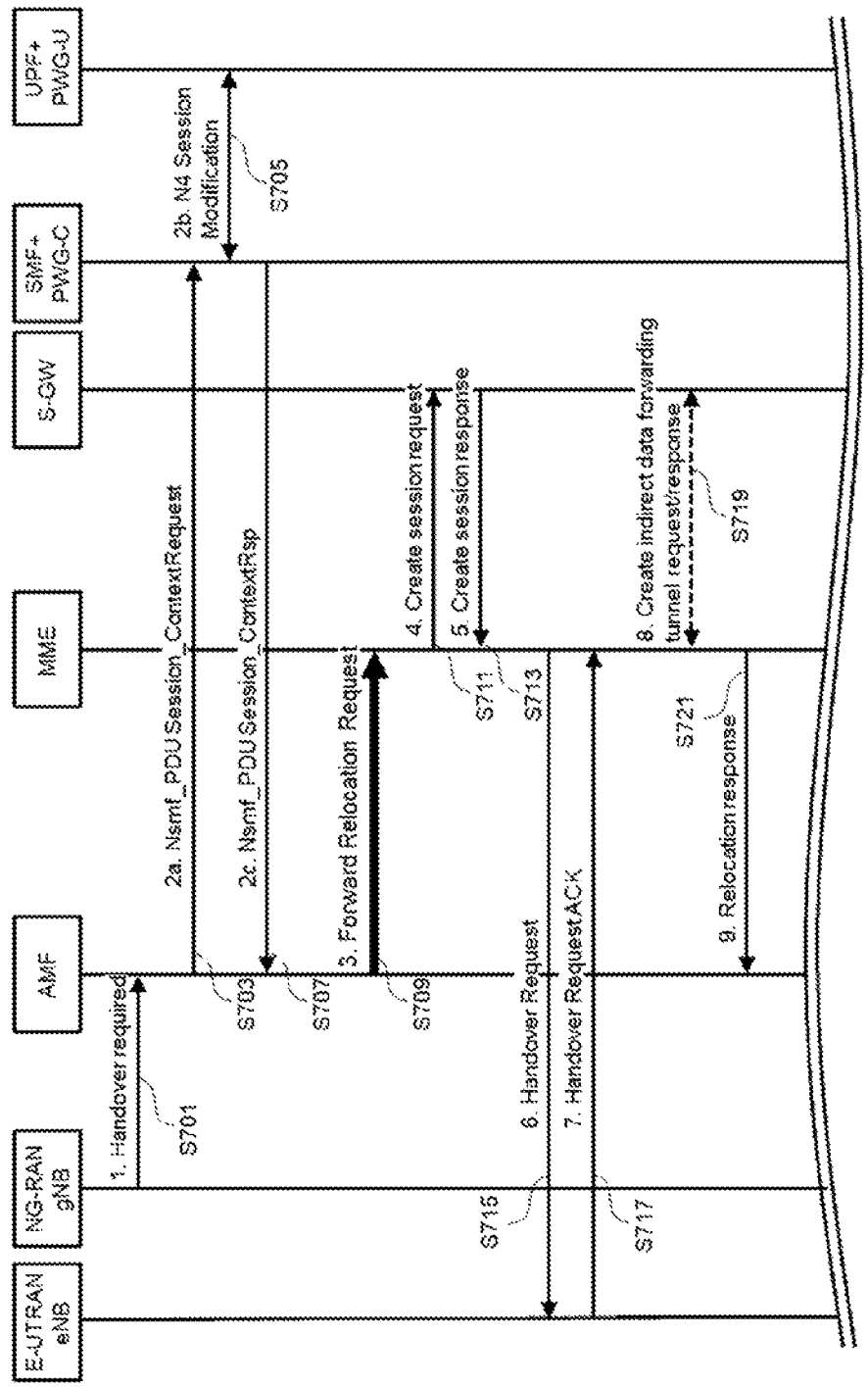
FIG. 8 is a sequence diagram illustrating a part of an intersystem handover procedure.

With reference to FIG. 7 and FIG. 8, a procedure of intersystem handover will be described. For example, FIG. 7 is a schematic diagram illustrating architecture in interconnection between the 5GC and the EPC. For example, FIG. 8 is a sequence diagram illustrating a part of the intersystem handover procedure.

In S402 of FIG. 5 described above, the first network node 200 (first communication processing unit 202) transmits a message for intersystem handover including the network slice related information 500 to the second network node 300. The message may be a message based on standards of 3GPP. In addition, the message may be a message for intersystem handover, and a message for management of mobility of the UE 10. More specifically, the message may be the "3. Forward Relocation Request" message illustrated in S709 of FIG. 8.

Note that the message for the intersystem handover may be a mandatory message or an optional message for the procedure of the intersystem handover. The message for the intersystem handover may be a message not based on standards of 3GPP. The message for the intersystem handover is not limited to the example described above, and may be any message that is transmitted based on the occurrence of the intersystem handover.

(3) Selection of Core Network

The second network node 300 (second network selection unit 303) obtains information related to network characteristics of the network slice that has been used by the UE 10 in the first radio communication system 2, with reference to the network slice related information 500. Then, the second network node 300 (second network selection unit 303) selects a core network corresponding to the network characteristics of the network slice that has been used by the UE 10 out of one or more core networks included in the second core network 30.

For example, the second network node 300 (second network selection unit 303) selects a core network having network characteristics that satisfy a predetermined communication requirement required by the traffic of the UE 10. Note that the predetermined communication requirement may be arbitrarily determined according to an application, a user, service contents, contract contents, a security level, a business style, an operation and management style, a geographical condition, and the like.

The second network node 300 (second network selection unit 303) may select the core network to be used by the UE 10, based on a predetermined rule, a policy, a type of the UE, a network load, a node load, a failure state, or the like in addition to (or in place of) the network slice related information 500. The second network node 300 (second network selection unit 303) may also select the network in the second core network 30 for other UEs to use the second radio communication system 3 from the beginning. Specifically, the second network node 300 (second network selection unit 303) may select the core network in the second core network 30 for other UEs that do not perform the intersystem handover.

As a specific example, the following will give a description of an example in which the second network node 300 (second network selection unit 303) selects a core network in the second core network 30 by using one or more selection criteria. In particular, the following will give a description of an example in which first to fourth selection criteria are used.

(3-1) First Selection Criterion

The first selection criterion is a selection criterion based on a traffic type of the UE 10. The second network node 300 may select a core network with reference to the identification information 501 included in the network slice related information 500. As a specific example, when the slice indicated by the identification information 501 is "eMBB", the second network node 300 (second network selection unit 303) selects a core network that handles traffic of a type the same as that of the traffic included in the range of the communication requirement corresponding to "eMBB". For example, the second network node 300 (second network selection unit 303) selects a DCN having characteristics of "high speed".

As another specific example, when "eMBB" is a slice that handles voice traffic and video streaming traffic, the second network node 300 (second network selection unit 303) may select a core network that handles voice traffic and video streaming traffic. Alternatively, when "eMBB" is a slice that handles a permissible delay time period of a predetermined range, the second network node 300 (second network selection unit 303) selects a core network that handles traffic having a communication requirement of a permissible delay time period similar to the predetermined range. Note that, when there is no core network that handles traffic of a type the same as that of the traffic identified based on the identification information 501 of the network slice related information 500, the second network node 300 (second network selection unit 303) may select a default core network. Alternatively, the second network node 300 (second network selection unit 303) may select a core network by making an enquiry to another node.

(3-2) Second Selection Criterion

The second selection criterion is a selection criterion based on a quality value allocated to the traffic of the UE 10. The second network node 300 may select a core network with reference to the quality information 503 included in the network slice related information 500. The quality information 503 is information indicating QoS allocated to a communication flow belonging to a network slice. Here, the second network node 300 may hold a list of pieces of information indicating QoS allocated to communication flows belonging to core networks. By searching the list for quality information of a core network corresponding to the quality information 503, the second network node 300 may select a core network in the second core network 30 corresponding to the quality information 503.

More specifically, the list of pieces of information indicating QoS allocated to communication flows belonging to core networks is a list of QoS Class Indicators (QCIs). The second network node 300 may determine whether or not the QoS characteristics corresponding to the quality information 503 included in the network slice related information 500 correspond to the QoS characteristics in the list of the QCIs. When there are corresponding QoS characteristics, the second network node 300 (second network selection unit 303) selects a core network corresponding to the QoS characteristics. Specifically, when the 5QI of the quality information 503 and the QCI held in the second network node 300 correspond to each other on a one-to-one basis, the second network node 300 (second network selection unit 303) selects the QCI as the core network in the second core network 30 to be supported. In contrast, when the 5QI of the quality information 503 does not correspond to the QCI on a one-to-one basis, for example, when a plurality of 5QIs correspond to the QCI on a multiple-to-one basis, the second network node 300 (second network selection unit 303) may select the QCI as the core network to be supported. When there is no corresponding core network, the second network node 300 may select a default core network, or may select a core network configured in advance. Alternatively, the second network node 300 may select a core network by making an enquiry to another node.

(3-3) Third Selection Criterion

The third selection criterion is a selection criterion related to use of a network slice that has been used by the UE 10, and is a selection criterion related to accumulated use of the slice of the UE 10. The second network node 300 may select a core network with reference to the usage information 505 included in the network slice related information 500. For example, the usage information 505 may be the accumulated usage information 507 related to the network slice that the UE 10 has used before intersystem handover. The accumulated usage information 507 may be information related to a time period for the accumulated use.

More specifically, the second network node 300 obtains network characteristics and QoS characteristics of the network slice that the UE 10 has used for the longest time period, with reference to the accumulated usage information 507 included in the network slice related information 500. Then, the second network node 300 uses the characteristics of the slice having the largest value of the accumulated usage information 507 as the criterion for core network selection. When there is no corresponding core network, the second network node 300 may select a default core network or may select a core network configured in advance, or the second network node 300 may select a core network by making an enquiry to another node.

(3-4) Fourth Selection Criterion

The fourth selection criterion is a selection criterion related to use of the network slice that has been used by the UE 10, and is a selection criterion related to use within a predetermined period of the slice of the UE 10. The second network node 300 may select a core network with reference to the usage information 505 included in the network slice related information 500. For example, the usage information 505 may be the period usage information 509 related to the network slice that the UE 10 has used before intersystem handover. The period usage information 509 may be information related to a time period for use within the predetermined period.

More specifically, the second network node 300 obtains network characteristics and QoS characteristics of the network slice that the UE 10 has used before intersystem handover, with reference to the period usage information 509 included in the network slice related information 500. Then, the second network node 300 uses characteristics of the slice having the largest value of the period usage information 509 as the criterion for core network selection. When there is no corresponding core network, the second network node 300 may select a default core network or may select a core network configured in advance, or the second network node 300 may select a core network by making an enquiry to another node.

Here, one of the first to fourth selection criteria may be used by itself, or a combination of two or more of the first to fourth selection criteria may be used. A plurality of selection criteria may be applied simultaneously, with a weight being applied to each of the selection criteria. As a matter of course, the first to fourth selection criteria are not limited to the examples described above.

Regarding configuration of the first to fourth selection criteria, a criterion to be applied may be configured by the second network node 300, or a criterion may be configured from another network node. The first to fourth selection criteria may be dynamically updated depending on a traffic state, a load, a failure state, or the like.

As has been described in the above, in the above-described example according to the first example embodiment, with the second network node 300 of the handover target referring to the network slice related information 500 after intersystem handover of the UE 10, the second network node 300 can select a core network appropriate for the UE 10. Therefore, QoE deterioration of the user caused along with the intersystem handover can be prevented.

<2.5 Example Alterations>

Next, with reference to FIG. 9 and FIG. 10, example alterations of the first example embodiment will be described.

(1) First Example Alteration

In the above-described example according to the first example embodiment, the message for intersystem handover includes the network slice related information 500. In the first example alteration of the first example embodiment, the message further includes handover history information (Handover History Info) 900.

Figure 9:
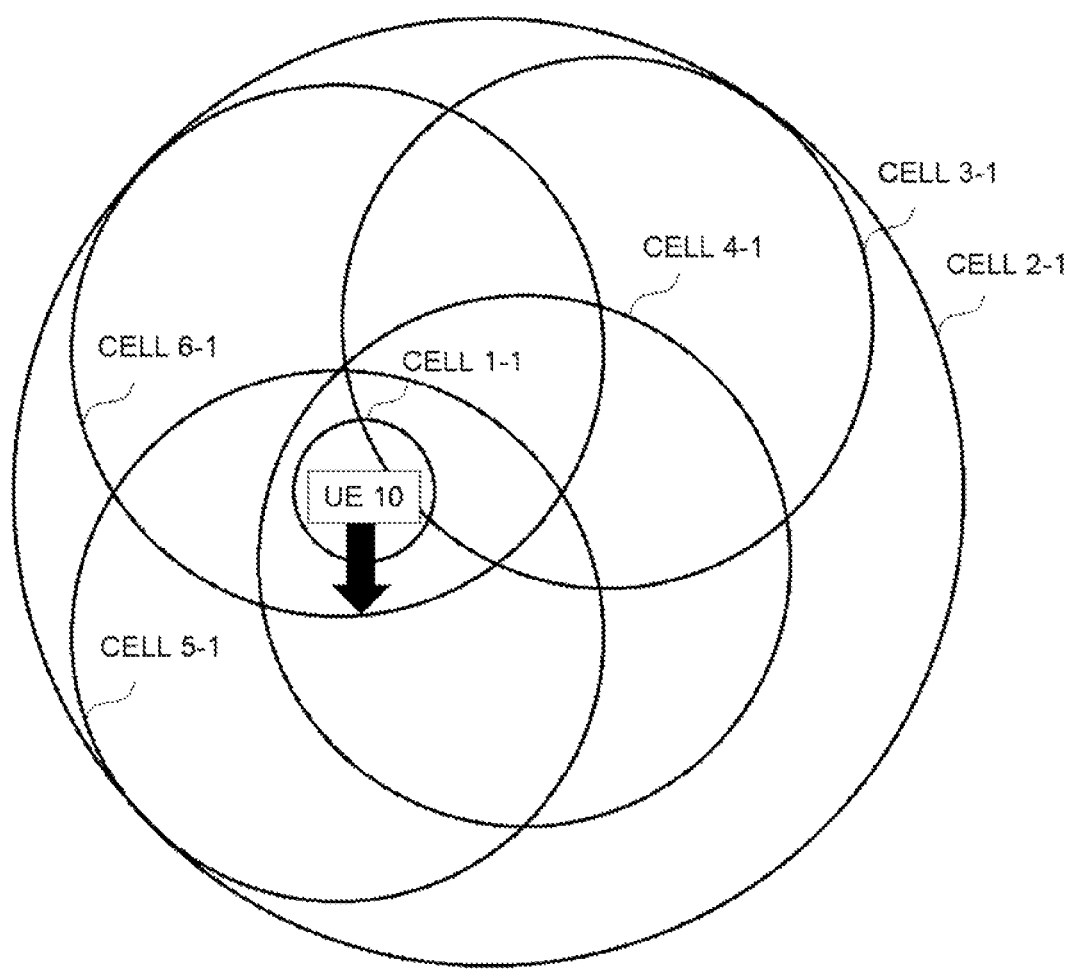
FIG. 9 is a diagram illustrating a cell 1-1 to which a UE 10 belongs and neighboring cells of the cell 1-1.
Figure 11:
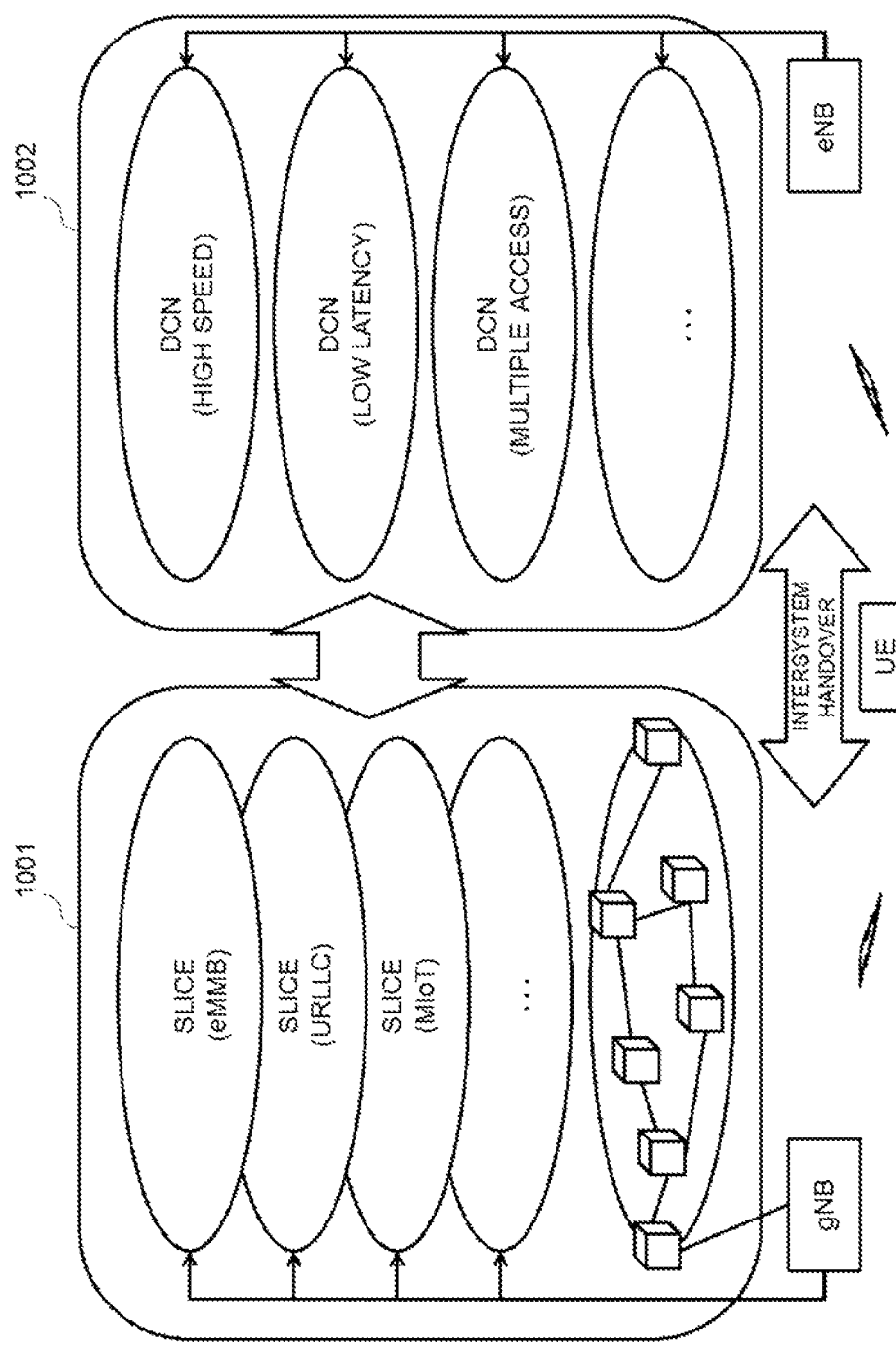
FIG. 11 is a schematic diagram of a system including a 5GC 1001 and an EPC 1002.

FIG. 9 illustrates the cell 1-1 to which the UE 10 belongs and neighboring cells of the cell 1-1. A symbol of an arrow extending from the UE 10 indicates handover in which the UE 10 is handed over from the cell 1-1 to another cell. The UE 10 can perform the handover from a source cell (cell 1-1) to a target cell (neighboring cell). For example, the cell 1-1 may be a cell covered by the first base station 40 of the first radio communication system 2, and neighboring cells other than the cell 1-1 may each be a cell covered by a predetermined base station of the second radio communication system 3.

When intersystem handover occurs, the second network node 300 (second communication processing unit 302) receives a message for the intersystem handover from the first network node 200. When the received message includes the network slice related information 500 and the handover history information 900, the second network node 300 (second network selection unit 303) may select a core network to be used by the UE 10 in the second radio communication system 3 out of one or more core networks included in the second core network 30, based on the network slice related information 500 and the handover history information 900.

The intersystem handover is handover from the source cell of the first radio communication system 2 to the target cell of the second radio communication system 3. The message transmitted in the procedure of the intersystem handover may include the handover history information 900 related to a history of the handover from the source cell to the target cell. The handover history information 900 may be statistical information related to the handover. The statistical information related to the handover may be statistical information related to inter-base station handover, or may be statistical information related to intersystem handover. For example, the handover history information 900 may indicate the number of handovers obtained by records performed every time the handover is performed. Here, there may be a failure in the handover procedure due to some cause. Thus, the handover history information 900 may indicate the probability that the handover procedure succeeds or fails when the UE 10 is handed over to the target cell of the second radio communication system 3.

For example, the handover history information 900 may include only information related to a handover history from the source cell to the target cell, or may include information related to a handover history from the source cell to each neighboring cell. With reference to FIG. 9 again, when the UE 10 moves in the direction of the arrow, there may be cells becoming closer to the UE 10 and cells becoming farther from the UE 10. The cells becoming closer to the UE 10 are cells whose communication quality with the UE 10 can be more likely to be enhanced or maintained, and the cells becoming farther from the UE 10 are cells whose communication quality of the UE 10 can be more likely to be deteriorated. For example, when handover to a cell 5-1 is performed, communication quality of the UE 10 can be more likely to be enhanced or maintained, and when handover to a cell 3-1 is performed, communication quality of the UE 10 can be more likely to be deteriorated.

More specifically, the handover history information 900 related to the handover of the UE 10 from the cell 1-1 to another cell includes information indicating whether or not communication quality is deteriorated for each of other cells. For example, the handover history information 900 may be information indicating the probability of success of the handover. For example, the handover history information 900 may indicate the number of successes and the number of failures of the handover in a predetermined period.

FIG. 10 is a diagram illustrating an example of the handover history information 900. As illustrated in the table of FIG. 10, success rate information 902 of the handover may be indicated for each of target cells 901, which is obtained using, for example, the number of successes and the number of failures of the handover, with a total number of handovers being a denominator. Note that the handover history information 900 may include information related to the accumulated number of times of the handover or frequency of the handover, for example. As a matter of course, the handover history information 900 is not limited to the example described above.

The handover history information 900 can be obtained in the first radio communication system 2. The handover history information 900 may be obtained by a radio access network of the first radio communication system 2, or may be obtained by a network node in the first core network 20. More specifically, the handover history information 900 may be collected by the first base station 40 of the first radio communication system 2. The first network node 200 (first information obtaining unit 201) may obtain the handover history information 900 transmitted by the first base station 40. Alternatively, the handover history information 900 may be collected by the UE 10.

For example, the handover history information 900 may be included in a predetermined management message transmitted by a node in the radio access network of the first radio communication system 2 to the first network node 200. The predetermined management message may be a management message transmitted based on the probability of handover. Specifically, the predetermined management message may be transmitted by using a signaling protocol of an application layer that conforms to standards of 3GPP, which is a protocol referred to as NG Application Protocol (NGAP). For example, the predetermined management message transmitted in NGAP may be a "HANDOVER REQUIRED" message.

As one specific example, the first network node 200 (first information obtaining unit 201) may obtain the handover history information 900 by receiving the NGAP: HANDOVER REQUIRED message including the handover history information 900 from the first base station 40 of the first radio communication system 2.

Meanwhile, the second network node 300 determines whether or not the handover history information 900 is included in the message for the intersystem handover. The second network node 300 (second network selection unit 303) selects a core network to be used by the UE 10 in the second radio communication system 3, based on the network slice related information 500 and the handover history information 900. For example, the second network node 300 determines whether or not the traffic corresponding to the core network selected based on the network slice related information 500 can permit the probability of handover success indicated by the handover history information 900.

There may be a failure in the procedure of the intersystem handover. When there is a failure in the procedure of the intersystem handover, reconnection processing or the like is caused, which may require a long time period before completion of the intersystem handover. Thus, for example, the second network node 300 may determine whether or not the time period required before completion of the intersystem handover exceeds a permissible delay time period permitted by the traffic of the UE 10. More specifically, when the time period required before completion of the intersystem handover is longer than a predetermined time period, the second network node 300 may determine that the service satisfying the communication requirement required by the traffic of the UE 10 cannot be continued in the core network selected by the second network node 300.

A specific example will be described with reference to the table of FIG. 10. When the cell 3-1 having a low probability of handover success (success rate information 902: 70%) is selected as the target cell of the handover, the second core network 30 cannot guarantee maintenance of the service requiring reliability such as URLLC (ultra low latency) that has been used in the first core network 20. On the other, hand, when a cell having a high probability of handover success (success rate information 902: 99%) other than the cell 3-1 is selected as the target cell of the handover, the second core network 30 may be able to maintain the service requiring the reliability.

Thus, the second network node 300 can select a core network appropriate for use of the UE 10, based on the network slice related information 500, and can also determine whether or not the service of the UE 10 can be maintained, based on the handover history information 900. Specifically, the second network node 300 can guarantee selection of a core network appropriate for use of the UE 10, based on the handover history information 900.

According to the first example alteration, the second network node 300 can select a core network appropriate for use of the UE 10, based on probability of success of the handover, and QoE deterioration of the user caused along with the intersystem handover can be prevented.

(2) Second Example Alteration

The above-described example according to the first example embodiment has described a case in which the intersystem handover is performed from the first radio communication system 2 to the second radio communication system 3. A second example alteration of the first example embodiment will describe a case in which the intersystem handover is performed from the second radio communication system 3 to the first radio communication system 2.

The configuration that the first network node 200 includes the first information obtaining unit 201 and the first communication processing unit 202 has already been described above, and thus description thereof will be omitted. The second example alteration will describe an example aspect in which the first network node 200 uses the first network selection unit 203 in particular.

The first network selection unit 203 selects a network slice to be used by the UE 10. For example, the first network selection unit 203 selects a network slice appropriate for the UE 10, based on one or more pieces of predetermined information. The one or more pieces of predetermined information may be obtained from the outside of the first network node 200, or may be obtained from the inside of the first network node 200. More specifically, the network selection unit 203 obtains information related to the communication requirement required by the traffic of the UE 10, and selects network slice appropriate for the UE out of one or more network slices included in the first core network 20. Alternatively, the first network selection unit 203 may select a network slice to be used by the UE 10, based on a failure state, a load state, or the like in the first core network 20.

The configuration that the second network node 300 includes the second communication processing unit 302 and the second network selection unit 303 has already been described above, and thus description thereof will be omitted. The second example alteration will describe an example aspect in which the second network node 300 uses the second information obtaining unit 301 in particular.

The second information obtaining unit 301 obtains predetermined information related to the second core network 30 to be used by the UE 10. For example, the predetermined information obtained by the second information obtaining unit 301 is information related to one or more core networks included in the second core network 30. More specifically, the information related to one or more core networks is information related to the DCN to be used by the UE 10 in the second radio communication system 3, and the number of pieces of the information may be one or more. The information related to the DCN to be used by the UE 10 is referred to as, for example, DCN related information (DCN Related Info).

The obtaining performed by the second information obtaining unit 301 may be obtaining from a predetermined module or storage means present inside the second network node 300. Alternatively, the obtaining performed by the second information obtaining unit 301 may be obtaining from an external apparatus (or node) of the second network node 300.

The second network node 300 (second information obtaining unit 301) obtains information related to the DCNs 31 to 33 used by the UE 10 in the second radio communication system 3. The obtained information is referred to as the DCN related information. The second network node 300 (second communication processing unit 302) transmits a message for intersystem handover to the first network node 200. The transmitted message includes the DCN related information.

The first network node 200 (first communication processing unit 202) receives the message from the second network node 300. When the message includes the DCN related information, the first network node 200 (first network selection unit 203) selects a network slice to be used by the UE 10 in the first radio communication system 2, based on the DCN related information.

The DCN related information includes information for indicating network characteristics of the DCN to be used by the UE 10. For example, the DCN related information may include DCN identification information. The DCN identification information is information for identifying the DCN to be used by the UE 10, and various forms of information, such as character information, symbol information, numerical value information, or coded information, may be adopted. More specifically, the identification information includes information for allowing identification of the DCN, such as "high speed" and "low latency".

A receiver node (for example, the first network node 200) that receives the DCN related information may hold information related to communication requirements of the traffic or network characteristics corresponding to the DCN identification information such as "high speed" and "low latency" or the like in advance. For example, when the DCN indicated by the DCN identification information is "high speed", the receiver node (for example, the first network node 200) may hold information for allowing identification that the traffic belonging to the slice is of a traffic type of voice data, video streaming, or the like. Alternatively, when the slice indicated by the DCN identification information is "high speed", the receiver node (for example, the first network node 200) may hold information for allowing identification that the traffic belonging to the slice is of a traffic type in which a permissible delay time period is a predetermined time period and the packet error rate is defined as a predetermined value.

For example, the DCN related information may include DCN quality information. The DCN quality information may be information indicating a communication requirement required by the traffic of the UE 10. This is because the network characteristics of the DCN to be used by the UE 10 are in some cases determined in accordance with the communication requirement required by the traffic of the UE 10. Specifically, the DCN quality information may be information indicating QoS. More specifically, the DCN quality information may be information indicating QoS allocated to a communication flow that belongs to a predetermined DCN in the second radio communication system 3. The information indicating the QoS may be QCI that conforms to standards of 3GPP. Note that using the value of the QCI is merely an example.

For example, the DCN related information may include DCN usage information. The DCN usage information is information related to the DCN that has been used by the UE 10, and is information related to use for each DCN. For example, the DCN usage information may be time information related to time in which the UE 10 has used a specific DCN. More specifically, the time information includes at least one or more of DCN accumulated usage information related to an accumulated time period in which the DCN has been used, and DCN period usage information indicating a time period in which the DCN has been used within a predetermined period before handover. Alternatively, the DCN usage information may include the number of times, frequency, intervals, or the like of the UE 10 having used a specific DCN. The usage information may be a time period, the number of times, frequency, intervals, or the like of the UE 10 not using a specific DCN.

The DCN accumulated usage information indicates an accumulated time period for each DCN that has been used in the second radio communication system 3. For example, regarding the DCN accumulated usage information, time measurement can be started from any time point, and accumulation can be reset at any time point. The DCN accumulated usage information can indicate statistical information related to DCN use of the UE 10.

The DCN period usage information indicates a time period for each DCN that has been used in the second radio communication system 3, and a time period that has been used within a predetermined period before handover. For example, the DCN period usage information may be a time period in which the UE 10 has used the DCN from a specific time point that is converted based on a time point at which handover occurs to a time point at which the handover occurs. The DCN period usage information can indicate a short-term tendency related to DCN use of the UE 10. Note that, as a matter of course, the DCN period usage information is not limited to the example described above.

In intersystem handover, the second network node 300 (second communication processing unit 302) transmits a message for intersystem handover including the DCN related information to the first network node 200. The message may be a message based on standards of 3GPP. In addition, the message may be a message for intersystem handover, and a message for management of mobility of the UE 10. More specifically, the message may be the "Forward Relocation Request" message.

Note that the message for the intersystem handover may be a mandatory message or an optional message for the procedure of the intersystem handover. The message for the intersystem handover may be a message not based on standards of 3GPP. The message for the intersystem handover is not limited to the example described above, and may be any message that is transmitted based on the occurrence of the intersystem handover.

The first network node 200 (first network selection unit 203) obtains information related to network characteristics of the DCN that has been used by the UE 10 in the second radio communication system 3, with reference to the DCN related information. Then, the first network node 200 (first network selection unit 203) selects a network slice corresponding to the network characteristics of the DCN that has been used by the UE 10 out of one or more network slices included in the first core network 20.

For example, the first network node 200 (first network selection unit 203) selects a network slice having network characteristics that satisfy a predetermined communication requirement required by the traffic of the UE 10. Note that the predetermined communication requirement may be arbitrarily determined according to an application, a user, service contents, contract contents, a security level, a business style, an operation and management style, a geographical condition, and the like.

The first network node 200 (first network selection unit 203) may select the network slice to be used by the UE 10, based on a predetermined rule, a policy, a type of the UE, a network load, a node load, a failure state, or the like in addition to (or in place of) the DCN related information. The first network node 200 (first network selection unit 203) may also select the network in the first core network 20 for other UEs to use the first radio communication system 2 from the beginning. Specifically, the first network node 200 (first network selection unit 203) may select the network slice in the first core network 20 for other UEs that do not perform the intersystem handover.

As a specific example, the following will give a description of an example in which the first network node 200 (first network selection unit 203) selects a core network in the second core network 30 by using one or more selection criteria. In particular, the following will give a description of an example in which the fifth to eighth selection criteria are used. Note that the fifth to eighth selection criteria correspond to the first to fourth selection criteria described above.

The fifth selection criterion is a selection criterion based on a traffic type of the UE 10. The first network node 200 may select a network slice with reference to the DCN identification information included in the DCN related information. As a specific example, when the slice indicated by the DCN identification information is "high speed", the first network node 200 (first network selection unit 203) selects a network slice that handles traffic of a type the same as that of the traffic included in the range of the communication requirement corresponding to "high speed". For example, the first network node 200 (first network selection unit 203) selects a network slice having characteristics of "eMBB". Note that, when there is no network slice that handles traffic of a type the same as that of the traffic identified based on the DCN identification information of the DCN related information, the first network node 200 (first network selection unit 203) may select a default network slice. Alternatively, the first network node 200 (first network selection unit 203) may select a network slice by making an enquiry to another node.

The sixth selection criterion is a selection criterion based on a quality value allocated to the traffic of the UE 10. The first network node 200 may select a core network with reference to the DCN quality information included in the DCN related information. The DCN quality information is information indicating QoS allocated to a communication flow belonging to a DCN. Here, the first network node 200 may have a list of pieces of information indicating QoS allocated to communication flows belonging to network slices. By searching the list for quality information of a network slice corresponding to the DCN quality information, the first network node 200 may select a network slice in the first core network 20 corresponding to the DCN quality information.

More specifically, the list of pieces of information indicating QoS allocated to communication flows belonging to network slices is a list of 5QIs. The first network node 200 may determine whether or not the QoS characteristics corresponding to the DCN quality information included in the DCN related information correspond to the QoS characteristics in the list of the 5QIs. When there are corresponding QoS characteristics, the first network node 200 (first network selection unit 203) selects a network slice corresponding to the QoS characteristics. Specifically, when the QCI of the DCN quality information and the 5QI of the first network node 200 correspond to each other on a one-to-one basis, the first network node 200 (first network selection unit 203) selects the 5QI as the network slice in the first core network 20 to be supported. In contrast, when the QCI of the DCN quality information does not correspond to the 5QI on a one-to-one basis, for example, when a plurality of QCIs correspond to the 5QI on a multiple-to-one basis, the first network node 200 (first network selection unit 203) may select the 5QI as the network slice to be supported. When there is no corresponding network slice, the first network node 200 may select a default network slice, or may select a network slice configured in advance. Alternatively, the first network node 200 may select a network slice by making an enquiry to another node.

The seventh selection criterion is a selection criterion related to use of a DCN that has been used by the UE 10, and is a selection criterion related to accumulated use of the DCN of the UE 10. The first network node 200 may select a network slice with reference to the DCN usage information included in the DCN related information. For example, the DCN usage information may be the DCN accumulated usage information related to the DCN that the UE 10 has used before intersystem handover. The DCN accumulated usage information may be information related to a time period for the accumulated use.

The eighth selection criterion is a selection criterion related to use of a DCN that has been used by the UE 10, and is a selection criterion related to use of the DCN of the UE 10 in a predetermined period. The first network node 200 may select a network slice with reference to the DCN usage information included in the DCN related information. For example, the DCN usage information may be the DCN period usage information related to the DCN that the UE 10 has used before intersystem handover. The DCN period usage information may be information related to a time period used within a predetermined period.

Here, one of the fifth to eighth selection criteria may be used by itself, or a combination of two or more of the fifth to eighth selection criteria may be used. A plurality of selection criteria may be applied simultaneously, with a weight being applied to each of the selection criteria. As a matter of course, the fifth to eighth selection criteria are not limited to the examples described above.

Regarding configuration of the fifth to eighth selection criteria, a criterion applied by the first network node 200 may be configured, or a criterion may be configured from another network node. The fifth to eighth selection criteria may be dynamically updated according to a traffic state, a load, a failure state, or the like.

As has been described in the above, in the above-described example according to the second example alteration of the first example embodiment, with the first network node 200 of the handover target referring to the DCN related information after intersystem handover of the UE 10, the first network node 200 can select a network slice appropriate for the UE 10. Therefore, QoE deterioration of the user caused along with the intersystem handover can be prevented.

(3) Third Example Alteration

In the above-described example according to the second example alteration of the first example embodiment, the message for the intersystem handover includes the DCN related information. In a third example alteration of the first example embodiment, the message further includes second handover history information.

When intersystem handover occurs, the first network node 200 (first communication processing unit 202) receives a message for the intersystem handover from the second network node 300. When the received message includes the DCN related information and the second handover history information, the first network node 200 (first network selection unit 203) may select a network slice to be used by the UE 10 in the first radio communication system 2 out of one or more network slices included in the first core network 20, based on the DCN related information and the second handover history information.

The intersystem handover is handover from the source cell of the second radio communication system 3 to the target cell of the first radio communication system 2. The message transmitted in the procedure of the intersystem handover may include the second handover history information related to a history of the handover from the source cell to the target cell. The second handover history information may be statistical information related to the handover. The statistical information related to the handover may be statistical information related to inter-base station handover, or may be statistical information related to inter-system handover. For example, the second handover history information may indicate the number of handovers obtained by records performed every time the handover is performed. Here, there may be a failure in the handover procedure due to some cause. Thus, the second handover history information may indicate the probability that the handover procedure succeeds or fails when the UE 10 is handed over to the target cell of the first radio communication system 2.

For example, the second handover history information may include only information related to a handover history from the source cell to the target cell, or may include information related to a handover history from the source cell to two or more neighboring cells. More specifically, the second handover history information may be information indicating the probability of success of the handover. For example, the second handover history information may indicate the number of successes and the number of failures of the handover in a predetermined period. More specifically, second success rate information of the handover may be indicated for each target cell, which is obtained using, for example, the number of successes and the number of failures of the handover, with a total number of handovers being a denominator. Note that the second handover history information may include information related to the accumulated number of times of the handover or frequency of the handover, for example. As a matter of course, the second handover history information is not limited to the example described above.

The second handover history information can be obtained in the second radio communication system 3. The second handover history information may be obtained by a radio access network of the second radio communication system 3, or may be obtained by a network node in the second core network 30. More specifically, the second handover history information may be collected by the second base station 50 of the second radio communication system 3. The second network node 300 (second information obtaining unit 301) may obtain the second handover history information from the second base station 50. Alternatively, the second handover history information may be collected by the UE 10, and the second network node 300 (second information obtaining unit 301) may obtain the second handover history information from the UE 10.

Meanwhile, the first network node 200 determines whether or not the second handover history information is included in the message for the intersystem handover. The first network node 200 (first network selection unit 203) selects a network slice to be used by the UE 10 in the first radio communication system 2, based on the DCN related information and the second handover history information. For example, the first network node 200 determines whether or not the traffic corresponding to the network slice selected based on the DCN related information can achieve the probability of handover success indicated by the second handover history information.

More specifically, when a time period required before completion of the intersystem handover is longer than a predetermined time period, the first network node 200 may determine that the service satisfying the communication requirement required by the traffic of the UE 10 cannot be continued in the network slice selected by the first network node 200.

Thus, the first network node 200 can select a network slice appropriate for use of the UE 10, based on the DCN related information, and can also determine whether or not the service of the UE 10 can be maintained, based on the second handover history information. Specifically, the first network node 200 can guarantee selection of a network slice appropriate for use of the UE 10, based on the second handover history information.

According to the third example alteration, the first network node 200 can select a network slice appropriate for use of the UE 10, based on probability of success of the handover, and QoE deterioration of the user caused along with the intersystem handover can be prevented.

3. Second Example Embodiment

Figure 12:
FIG. 12 is a diagram illustrating a first network node 200 and a second network node 300 according to a second example embodiment.
Figure 13:
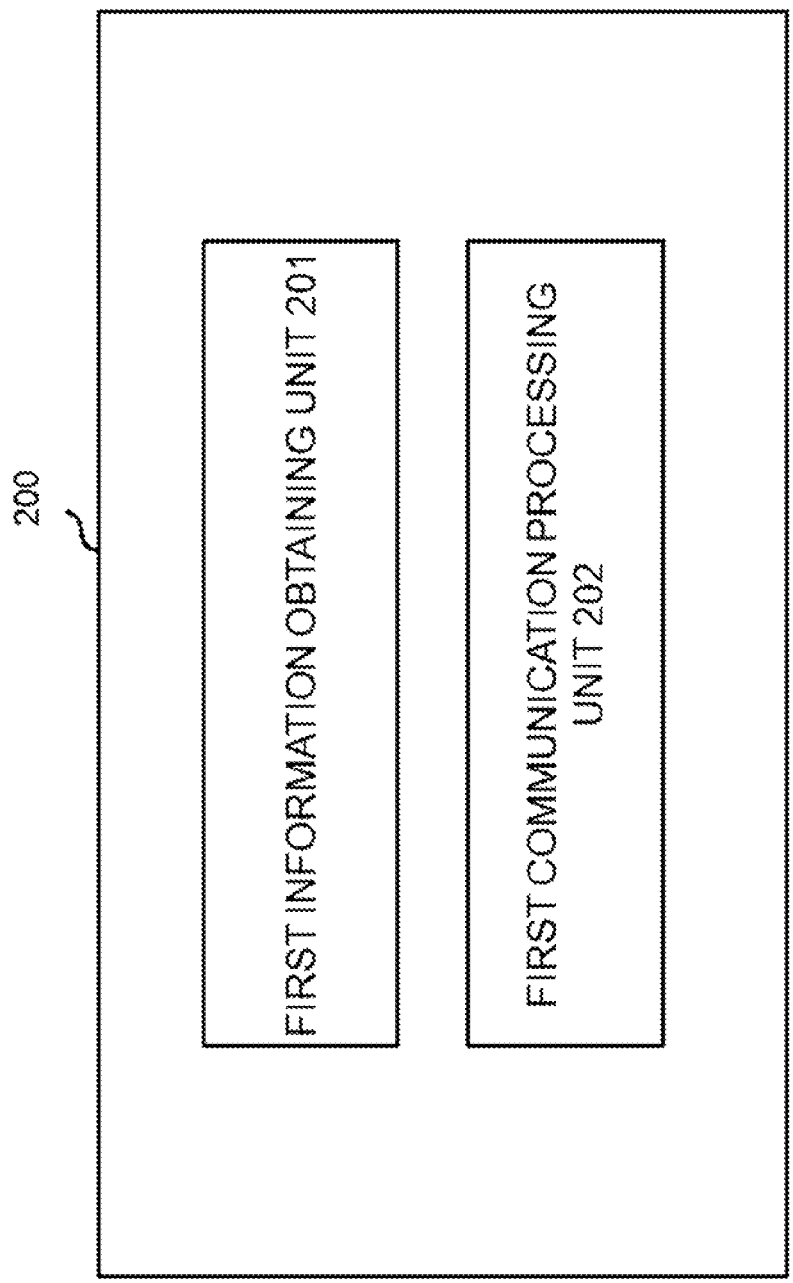
FIG. 13 is a diagram illustrating the first network node 200 according to the second example embodiment.
Figure 14:
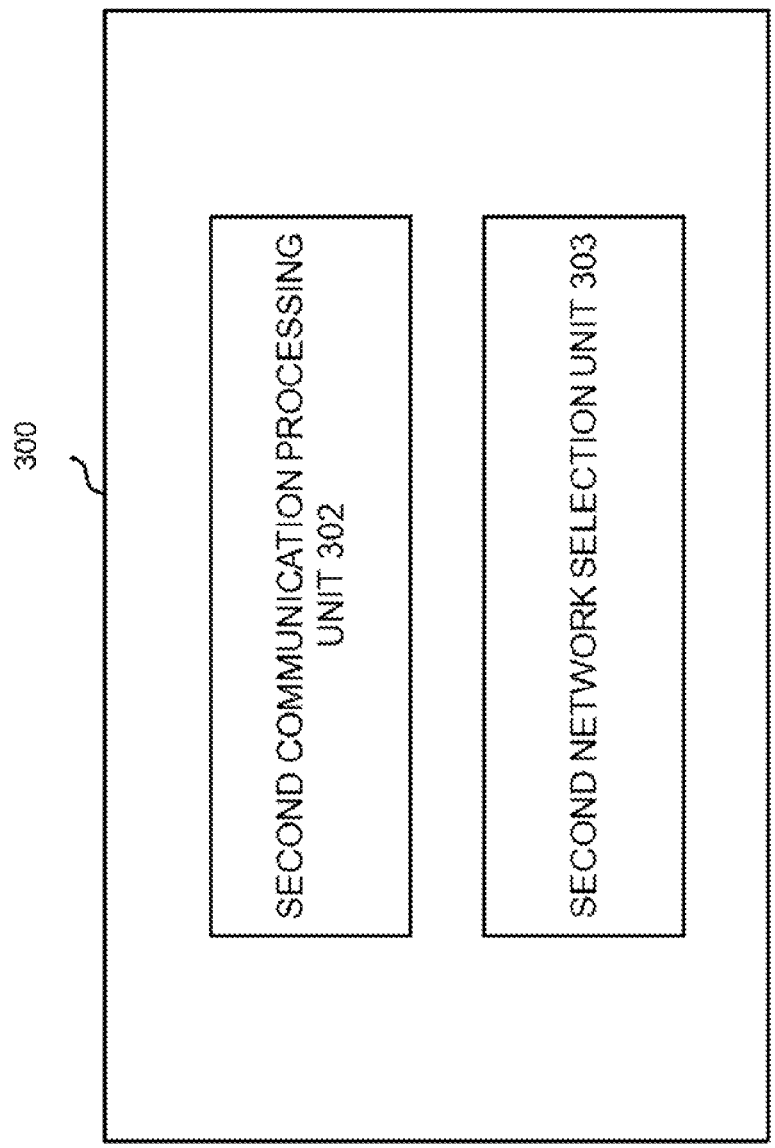
FIG. 14 is a diagram illustrating the second network node 300 according to the second example embodiment.

With reference to FIGS. 12 to 14, a second example embodiment will be described.

<3.1 System Configuration>

FIG. 12 is a diagram illustrating a basic system configuration according to the second example embodiment. The basic system configuration according to the second example embodiment includes a first network node 200 and a second network node 300. The first network node 200 transmits, to the second network node 300, a message for intersystem handover, which is the message including the network slice related information 500.

<3.2 Configuration of First Network Node 200>

FIG. 13 is a diagram illustrating the first network node 200 according to the second example embodiment. The first network node 200 includes one or more functional units. For example, the first network node 200 includes a first information obtaining unit 201 and a first communication processing unit 202. As a matter of course, the first network node 200 may include another functional unit.

The first information obtaining unit 201 obtains predetermined information related to the first core network 20 used by the UE 10. For example, the predetermined information obtained by the first information obtaining unit 201 is information related to the network slice included in the first core network 20. More specifically, the information related to the network slice is information related to the network slice used by the UE 10 in the first radio communication system 2, and the number of pieces of the information may be one or more. In the second example embodiment, the information related to the network slice used by the UE 10 is referred to as, for example, network slice related information (Network Slicing Related Info) 500.

The obtaining performed by the first information obtaining unit 201 may be obtaining from a predetermined module or storage means present inside the first network node 200. Alternatively, the obtaining performed by the first information obtaining unit 201 may be obtaining from an external apparatus (or node) of the first network node 200.

The first communication processing unit 202 performs communication processing with the UE 10, the first base station 40, the network node in the first radio communication system 2, and the network node in the second radio communication system 3. For example, the first communication processing unit 202 performs communication processing for intersystem handover with a predetermined network node in the second radio communication system 3. More specifically, the first communication processing unit 202 performs communication processing for intersystem handover by transmitting and receiving one or more messages to and from the second network node 300 in the second radio communication system 3.

<3.3 Configuration of Second Network Node 300>

FIG. 14 is a diagram illustrating the second network node 300 according to the second example embodiment. The second network node 300 includes one or more functional units. For example, the second network node 300 includes a second communication processing unit 302 and a second network selection unit 303. As a matter of course, the second network node 300 may include another functional unit.

The second network selection unit 303 selects a core network to be used by the UE 10. For example, the second network selection unit 303 selects a core network that is appropriate for the UE 10, based on one or more pieces of predetermined information. The one or more pieces of predetermined information may be obtained from the outside of the second network node 300, or may be obtained from the inside of the second network node 300. More specifically, the second network selection unit 303 selects a core network appropriate for the UE 10 out of one or more core networks included in the second core network 30, with reference to information related to a communication requirement required by the traffic of the UE 10. Alternatively, the second network selection unit 303 may select a core network to be used by the UE 10, based on a failure state, a load state, or the like in the second core network 30.

The second communication processing unit 302 performs communication processing with the UE 10, the second base station 50, the network node in the second radio communication system 3, and the network node in the first radio communication system 2. For example, the second communication processing unit 302 performs communication processing for intersystem handover with a network node in the first radio communication system 2. More specifically, the second communication processing unit 302 performs communication processing for intersystem handover by transmitting and receiving one or more messages to and from the first network node 200 in the first radio communication system 2.

<3.4 Technical Features>

With reference to FIGS. 12 to 14, technical features according to the second example embodiment will be described.

The first network node 200 of the first radio communication system includes: the information obtaining unit (first information obtaining unit 201) configured to obtain the network slice related information 500 related to a network slice used by the terminal apparatus (UE 10) in the first radio communication system 2; and the first communication processing unit 202 configured to transmit, to the second network node 300 of the second radio communication system 3, a message for intersystem handover of the terminal apparatus (UE 10) from the first radio communication system 2 to the second radio communication system 3, the message including the network slice related information 500.

The second network node 300 of the second radio communication system 3 includes: the communication processing unit (second communication processing unit 302) configured to receive, from the first network node 200 of the first radio communication system 2, a message for intersystem handover of the terminal apparatus (UE 10) from the first radio communication system 2 to the second radio communication system 3, the message including the network slice related information 500 related to a network slice used by the terminal apparatus (UE 10) in the first radio communication system 2; and the network selection unit (second network selection unit 303) configured to select a core network to be used by the terminal apparatus (UE 10) in the second radio communication system 3, based on the network slice related information 500.

The second network node 300 (second network selection unit 303) obtains information related to network characteristics of the network slice that has been used by the UE 10 in the first radio communication system 2, with reference to the network slice related information 500. Then, the second network node 300 (second network selection unit 303) selects a core network corresponding to the network characteristics of the network slice that has been used by the UE 10 out of one or more core networks included in the second core network 30.

As has been described in the above, in the above-described example according to the second example embodiment, with the second network node 300 of the handover target referring to the network slice related information 500 after intersystem handover of the UE 10, the second network node 300 can select a core network appropriate for the UE 10. Therefore, QoE deterioration of the user caused along with the intersystem handover can be prevented.

4. Other Example Embodiments

In the first example embodiment and the first to third example alterations thereof and the second example embodiment, description has been given on the assumption that the traffic belongs to only one network slice or one DCN. However, a similar method can be applied also to a case in which the traffic is shared by a plurality of slices or a plurality of DCNs.

Note that the UE 10 described in the Specification is not limited to a specific radio terminal apparatus. The UE 10 may be a terminal apparatus of a user. As a matter of course, however, the UE 10 is not limited to an apparatus of a specific application. For example, the UE 10 may be a mobile terminal, a smartphone, a personal computer, a digital camera, television equipment, audio equipment, a household electrical appliance, medical equipment, an IoT device, a drone terminal, an on-board terminal, or the like. The UE 10 may use a radio communication system via an access network of non-3GPP.

The radio access network described in the Specification may conform to standards of 3GPP, or may not conform to standards of 3GPP. For example, in the radio access network, the radio access network that conforms to the standard of IEEE 802.11 and IEEE 802.15 and a higher network thereof may be a radio communication system that does not conform to standards of 3GPP.

The core network described in the Specification is not limited to the core network included in the radio communication system. The present invention can be applied to a network including a plurality of slices through the use of the network slicing technique. For example, when there are a plurality of communication systems constituting a network including a plurality of slices through the use of the network slicing technique, the present invention can be applied to a mode of transferring the traffic of a user using one of the communication systems to another communication system. For example, the present invention may be applied to transfer between communication systems managed by different communication carriers. Alternatively, the present invention may be applied to transfer between an active communication system and a standby communication system.

Descriptions have been given above of the first example embodiment and the first to third example alterations thereof and the second example embodiment of the present invention. However, the present invention is not limited to these example embodiments. It should be understood by those of ordinary skill in the art that these example embodiments are merely examples and that various alterations are possible without departing from the scope and the spirit of the present invention.

For example, the steps in the processing described in the Specification may not necessarily be carried out in time series in the order described in the corresponding sequence diagram. For example, the steps in the processing may be carried out in an order different from that described in the corresponding sequence diagram or may be carried out in parallel. Some of the steps in the processing may be deleted, or more steps may be added to the processing.

An apparatus including the constituent elements of the network node described in the Specification may be provided. Moreover, methods including processing of the constituent elements may be provided, and programs for causing a processor to execute processing of the constituent elements may be provided. Moreover, non-transitory computer readable recording media (non-transitory computer readable media) having recorded thereon the programs may be provided. It is apparent that such nodes, modules, methods, programs, and non-transitory computer readable recording media are also included in the present invention.

The whole or part of the example embodiments disclosed above can also be described as the following supplementary notes. However, the following is not restrictive.
(Supplementary Note 1)

A first network node of a first radio communication system, comprising:

an information obtaining unit configured to obtain network slice related information related to a network slice used by a terminal apparatus in the first radio communication system; and a first communication processing unit configured to transmit, to a second network node of a second radio communication system, a message for intersystem handover of terminal apparatus from the first radio communication system to the second radio communication system, the message including the network slice related information.
(Supplementary Note 2)

The first network node according to Supplementary Note 1, wherein the network slice related information includes at least one of identification information of the network slice, a quality information indicating a Quality of Service (QoS) allocated to a communication flow belonging to the network slice, and usage information related to use of the network slice.
(Supplementary Note 3)

The first network node according to Supplementary Note 2, wherein the usage information includes any one or more pieces of information out of accumulated usage information indicating an accumulated time period in which the network slice has been used and period usage information indicating a time period in which the network slice has been used within a predetermined period before handover.
(Supplementary Note 4)

The first network node according to any one of Supplementary Notes 1 to 3, wherein the intersystem handover is handover from a source cell of the first radio communication system to a target cell of the second radio communication system, and the message includes handover history information related to a history of the handover from the source cell.
(Supplementary Note 5)

The first network node according to Supplementary Note 4, wherein the handover history information includes success rate information indicating a success rate of the handover from the source cell to a neighboring cell of the source cell.
(Supplementary Note 6)

The first network node according to Supplementary Note 5, wherein the handover history information includes a plurality of pieces of the success rate information regarding a plurality of neighboring cells of the source cell.
(Supplementary Note 7)

The first network node according to any one of Supplementary Notes 4 to 6, wherein the handover history information is received from a node in a radio access network of the first radio communication system.
(Supplementary Note 8)

The first network node according to any one of Supplementary Notes 1 to 7, wherein the first radio communication system is a 5G system, and the second radio communication system is an Evolved Packet System (EPS).
(Supplementary Note 9)

The first network node according to any one of Supplementary Notes 1 to 8, wherein the first network node is an Access and Mobility Management Function (AMF), and the second network node is a Mobility Management Entity (MME).
(Supplementary Note 10)

The first network node according to any one of Supplementary Notes 1 to 9, wherein the message is a Forward Relocation Request message.
(Supplementary Note 11)

A second network node of a second radio communication system, comprising:

a communication processing unit configured to receive, from a first network node of a first radio communication system, a message for intersystem handover of a terminal apparatus from the first radio communication system to the second radio communication system, the message including network slice related information related to a network slice used by the terminal apparatus in the first radio communication system; and a network selection unit configured to select a core network to be used by the terminal apparatus in the second radio communication system, based on the network slice related information.
(Supplementary Note 12)

The second network node according to Supplementary Note 11, wherein the intersystem handover is handover from a source cell of the first radio communication system to a target cell of the second radio communication system, the message includes handover history information related to a history of the handover from the source cell, and the network selection unit selects the core network to be used by the terminal apparatus in the second radio communication system, based on the network slice related information and the handover history information.

This application claims priority based on JP 2018-196760 filed on Oct. 18, 2018, the entire disclosure of which is incorporated herein.

INDUSTRIAL APPLICABILITY

This can be used for a network node in a radio communication system, and a communication method, a program, and a recording medium for the network node.

REFERENCE SIGNS LIST

1 System
2 First Radio Communication System
3 Second Radio Communication System
10 UE
20 First Core Network
30 Second Core Network
40 First Base Station
50 Second Base Station
21 to 23 Network Slice
31 to 33 DCN
200 First Network Node
300 Second Network Node
500 Network Slice Related Information
900 Handover History Information

What is claimed is:

1. An Access and Mobility Function (AMF) of a 5G radio communication system, comprising:
   a memory storing instructions; and
   one or more processors configured to execute the instructions to:
   obtain quality information related to a network slice used by a terminal apparatus in the 5G radio communication system; and
   transmit to Mobile Management Entity (MME) of a 4G radio communication system, a Forward Relocation Request message over an N26 interface,
   wherein the Forward Relocation Request message includes the quality information, and
   wherein the quality information includes a 5QI value.

2. The AMF according to claim 1, wherein
   the Forward Relocation Request message includes network slice related information, and wherein the network slice related information includes at least one of identification information of the network slice, and usage information related to use of the network slice.

3. The AMF according to claim 2, wherein
   the usage information includes any one or more pieces of information out of accumulated usage information indicating an accumulated time period in which the network slice has been used and period usage information indicating a time period in which the network slice has been used within a predetermined period before handover.

4. The AMF according to claim 1, wherein
   the Forward Relocation Request message is a message for intersystem handover of the terminal apparatus from the 5G radio communication system to the 4G radio communication system,
   the intersystem handover is handover from a source cell of the 5G radio communication system to a target cell of the 4G radio communication system, and
   the message includes handover history information related to a history of the handover from the source cell.

5. The AMF according to claim 4, wherein
   the handover history information includes success rate information indicating a success rate of the handover from the source cell to a neighboring cell of the source cell.

6. The AMF according to claim 5, wherein
   the handover history information includes a plurality of pieces of the success rate information regarding a plurality of neighboring cells of the source cell.

7. The AMF according to claim 4, wherein
   the handover history information is received from a node in a radio access network of the 5G radio communication system.

8. A Mobile Management Entity (MME) of a 4G radio communication system, comprising:
   a memory storing instructions; and
   one or more processors configured to execute the instructions to:
   receive from an Access and Mobility Function (AMF) of a 5G radio communication system, a Forward Relocation Request message over an N26 interface; and
   send, to the AMF, a response message in response to the Forward Relocation Request message,
   wherein the Forward Relocation Request message includes a quality information, and
   wherein the quality information includes a 5QI value.

9. The MME according to claim 8, wherein
   the Forward Relocation Request message is a message for intersystem handover, and wherein the intersystem handover is handover from a source cell of the 5G radio communication system to a target cell of the 4G radio communication system,
   the message includes handover history information related to a history of the handover from the source cell, and
   the one or more processors configured to execute the instructions to select a core network to be used by a terminal apparatus in the 4G radio communication system, based on network slice related information and the handover history information.

* * * * *